US008274733B2

(12) United States Patent
Noguchi

(10) Patent No.: US 8,274,733 B2
(45) Date of Patent: Sep. 25, 2012

(54) SEMICONDUCTOR OPTICAL AMPLIFICATION MODULE, OPTICAL MATRIX SWITCHING DEVICE, AND DRIVE CIRCUIT

(75) Inventor: Masaji Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 12/068,354

(22) Filed: Feb. 5, 2008

(65) Prior Publication Data

US 2008/0239472 A1 Oct. 2, 2008

(30) Foreign Application Priority Data

Mar. 26, 2007 (JP) ................................ 2007-079486

(51) Int. Cl.
*H01S 5/00* (2006.01)
*H01S 5/042* (2006.01)

(52) U.S. Cl. ................. 359/344; 372/38.02; 372/38.04; 372/38.07

(58) Field of Classification Search .................. 359/344; 372/38.02, 38.04, 38.07
See application file for complete search history.

(56) References Cited

U.S. PATENT DOCUMENTS 4,709,370 A * 11/1987 Bednarz et al. ............ 372/38.02
4,787,087 A * 11/1988 Hashimoto et al. ........ 372/38.02
2004/0160996 A1* 8/2004 Giorgi et al. .................... 372/25
2005/0088728 A1* 4/2005 Miyazaki ...................... 359/344
2005/0280021 A1* 12/2005 Hashimoto et al. ........... 257/103

FOREIGN PATENT DOCUMENTS

JP 62173782 A * 7/1987
JP 5-48369 6/1993

OTHER PUBLICATIONS

Patent Abstracts of Japan, Publication No. 2008-076554, published Apr. 3, 2008.
Patent Abstracts of Japan, Publication No. 2000-267054, published Sep. 29, 2000 (1 page).
Patent Abstracts of Japan, Publication No. 2001-154160, published Jun. 8, 2001 (1 page).
Patent Abstracts of Japan, Publication No. 07-046194, published Feb. 14, 1995 (1 page).

* cited by examiner

*Primary Examiner* — Eric Bolda
(74) *Attorney, Agent, or Firm* — Staas & Halsey LLP

(57) ABSTRACT

A semiconductor optical amplification module that can suppress ringing without increasing power consumption or circuit size or inhibiting high-speed operation. A semiconductor optical amplifier outputs an optical signal inputted according to driving current outputted from a drive circuit. A diode is connected in parallel with the semiconductor optical amplifier. As a result, it becomes possible to suppress ringing without connecting a large resistor to the drive circuit.

1 Claim, 20 Drawing Sheets

CONTROL CHANNEL
23
CONTROL CHANNEL SECTION
24
RESERVATION MANAGER
21
OPTICAL MATRIX SWITCH
22a
WAVELENGTH CONVERSION SECTION
22b
WAVELENGTH CONVERSION SECTION
22c
WAVELENGTH CONVERSION SECTION
22d
WAVELENGTH CONVERSION SECTION
OPTICAL DATA CHANNEL
OPTICAL DATA CHANNEL

SOAM
DRIVE CIRCUIT
42a
42b
42n
43a
43b
43n
41a
41b
41n
44
1
2
n

OPTICAL AMPLIFICATION FACTOR (dB)
20
10
0
-10
-20
-30
-40
-50
-60
-70
DRIVING CURRENT (mA)
0
50
100
150
200
250
300
350

DRIVING VOLTAGE (V)
OPTICAL AMPLIFICATION FACTOR (dB)
0
0.5
1
1.5
2
20
10
0
-10
-20
-30
-40
-50
-60
-70

DRIVING VOLTAGE (V)
1.8
1.6
1.4
1.2
1
0.8
0.65
0.6
0.4
0.2
0
EXTINCTION RATIO BETWEEN SOA SWITCHES (dB)
0
10
20
30
40
50
58
60
70
80

0.32V
A4
A3
$V_{SOA}$
$V_{SG}$
$I_{SOA}$
Output
T (Secs)
2.000
1.000
0.000
-1.000
0.000n
10.000n
20.000n
30.000n
40.000n
50.000n $V_{SG}$
$V_{SOA}$
$I_{SOA}$
A5
A6
0.6V
Output
Time (s)
2.00
1.00
0.00
-1.00
0.00
10.00n
20.00n
30.00n
40.00n
50.00n $V_{SG}$
$V_{SOA}$
$I_{SOA}$
Output
Time (s)
20.00
10.00
0.00
-10.00
0.00
10.00n
20.00n
30.00n
40.00n
50.00n

SEMICONDUCTOR OPTICAL AMPLIFICATION MODULE, OPTICAL MATRIX SWITCHING DEVICE, AND DRIVE CIRCUIT

CROSS-REFERENCE TO RELATED APPLICATIONS

This application is based upon and claims the benefits of priority from the prior Japanese Patent Application No. 2007-079486, filed on Mar. 26, 2007, the entire contents of which are incorporated herein by reference.

BACKGROUND OF THE INVENTION (1) Field of the Invention

This invention relates to a semiconductor optical amplification module, an optical matrix switching device, and a drive circuit and, more particularly, to a semiconductor optical amplification module for controlling the passing through of an optical signal, an optical matrix switching device for switching an optical output path, and a drive circuit for driving such a semiconductor optical amplification module.

(2) Description of the Related Art

High-speed large-capacity optical communication devices are required in optical communication networks to build multimedia networks in the future. Optical packet switching systems using high-speed optical switches which operate in several nanoseconds (ns) are being researched and developed as systems which realize high-speed large-capacity optical communication. Semiconductor optical amplifiers (SOA) are devices which can perform switching in several nanoseconds, that is to say, which can perform high-speed switching. It is expected that SOAs are applied to, for example, optical matrix switches in optical packet switching systems.

FIGS. 16A, 16B, and 16C are views for describing the operation of an SOA. In FIG. 16 A, an SOA 100 and a drive circuit 101 for driving the SOA 100 are shown. In addition, optical signals (optical packets) inputted to the SOA 100 are shown in FIG. 16A. Driving current supplied from the drive circuit 101 to the SOA 100 is shown in FIG. 16B. Optical signals outputted from the SOA 100 are shown in FIG. 16C.

A control signal is inputted to the drive circuit 101. The drive circuit 101 outputs the driving current shown in FIG. 16B to the SOA 100 according to the control signal.

When the driving current outputted from the drive circuit 101 is injected into an optical signal amplification area, the SOA 100 amplifies the optical signals propagating through the optical signal amplification area. By turning on/off the driving current, as shown in FIG. 16B, the SOA 100 is used as a gate element for the optical signals.

It is assumed that the driving current the timing of which is shown in FIG. 16B is supplied. The SOA 100 amplifies and outputs the optical signals #1 and #3 of the optical signals #1 through #3 shown in FIG. 16A. The SOA 100 attenuates and outputs the optical signal #2. As a result, the optical signals shown in FIG. 16C are outputted from the SOA 100.

FIG. 17 is a view showing an example of the structure of the drive circuit shown in FIG. 16A. As shown in FIG. 17, the drive circuit includes resistors R101 through R104, an operational amplifier (op-amp) OP101, and power sources P101 and P102. In addition to the drive circuit, an SOA module 110 including the SOA 100 is shown in FIG. 17. In FIG. 17, a parasitic inductance component produced by a substrate pattern of the drive circuit is equivalently shown as an inductor L101 and a parasitic inductance component produced by wirings in the SOA module 110 is equivalently shown as an inductor L102.

The op-amp OP101 shown in FIG. 17 is included in a non-inverting amplifier. The output current capacity of the op-amp OP101 is 300 mA or more. The settling time of the op-amp OP101 is about 2 ns. That is to say, the op-amp OP101 is a high-speed op-amp. A square-wave signal for turning on/off the SOA 100 is inputted to a non-inverting input terminal of the op-amp OP101. In FIG. 17, a square-wave signal is generated by a signal generator SG and is inputted. However, a desired square-wave signal is actually supplied from a field programmable gate array (FPGA) or a logic buffer circuit according to a control signal sent from a control section.

FIG. 18 is a view for describing ringing of the drive circuit shown in FIG. 17. A waveform $V_{SG}$ shown in FIG. 18 indicates voltage at a point $V_{SG}$ shown in FIG. 17. A waveform $V_{SOA}$ shown in FIG. 18 indicates voltage at a point $V_{SOA}$ shown in FIG. 17. A waveform $I_{SOA}$ shown in FIG. 18 indicates an electric current at a point $I_{SOA}$ shown in FIG. 17. Each waveform shown in FIG. 18 indicates a result obtained by doing a simulation by the use of element values shown in FIG. 17.

Setting is performed so that the voltage at the point $V_{SG}$ shown in FIG. 17 will be 1.5 V at the time of the signal generator SG being in an on state and so that the voltage at the point $V_{SG}$ shown in FIG. 17 will be 0 V at the time of the signal generator SG being in an off state. The non-inverting amplifier including the op-amp OP101 is set so as to output voltage which is equal to input voltage.

When a driving current of about 300 mA is passed through the SOA 100, an optical amplification factor of about 10 dB can be obtained. When driving current is decreased, the SOA 100 exhibits an optical attenuation characteristic. In this example, the operation of the SOA 100 is as follows. When a voltage of 1.5 V is outputted from the non-inverting amplifier, a driving current of about 300 mA runs through the SOA 100 and the SOA 100 turns on. When a voltage of 0 V is outputted from the non-inverting amplifier, an electric current does not run through the SOA 100 and the SOA 100 turns off.

Optical leakage may occur even when the SOA 100 is in anoff state. In this case, crosstalk may occur in a multiplexing coupler to which output from the SOA 100 is sent. Driving voltage of the SOA 100 must be set to 0.65 V or less in order to obtain the off state of the SOA under which crosstalk does not occur (in order to prevent the optical leakage of the SOA 100).

As described in FIG. 17, the drive circuit equivalently includes the inductor L101 and the SOA module 110 equivalently includes the inductor L102. In addition, the SOA 100 itself has a junction capacitance of 40 to 70 pF. Accordingly, when the SOA 100 is switched from the on state to the off state, electric charges charged at on time discharge and large ringing occurs in the drive circuit because of back electromotive force generated by the inductors L101 and L102.

As shown by the waveform $V_{SOA}$ of FIG. 18, ringing occurs in the circuit shown in FIG. 17 and a voltage of 0.65 V or more is generated (arrow A101). Therefore, though the drive circuit outputs driving current so as to put the SOA 100 in the off state, the SOA 100 reaches a light emission level. As a result, high-speed optical switching is inhibited.

FIG. 19 is a view showing an example of the structure of a drive circuit which suppresses ringing. Components in FIG. 19 that are the same as those shown in FIG. 17 are marked with the same symbols and descriptions of them will be omitted.

As shown in FIG. 19, a resistor R110 is connected between the drive circuit and an SOA module 110. In addition, an inductor L103 is connected to an output of an op-amp OP101. With the drive circuit shown in FIG. 19, the occurrence of ringing is suppressed by inserting the resistor R110.

FIG. 20 is a view for describing ringing of the drive circuit shown in FIG. 19. A waveform $V_{SG}$ shown in FIG. 20 indicates voltage at a point $V_{SG}$ shown in FIG. 19. A waveform $V_{SOA}$ shown in FIG. 20 indicates voltage at a point $V_{SOA}$ shown in FIG. 19. A waveform $I_{SOA}$ shown in FIG. 20 indicates an electric current at a point $I_{SOA}$ shown in FIG. 19. Each waveform shown in FIG. 20 indicates a result obtained by doing a simulation by the use of element values shown in FIG. 19.

As described in FIG. 19, the occurrence of ringing is suppressed by connecting the resistor R110 to output of the drive circuit. However, voltage drops by inserting the resistor R110. As a result, a large driving voltage of 10.5 V must be applied to pass a driving current of 300 mA through the SOA 100 and to turn on the SOA 100. Accordingly, the power consumption of the drive circuit increases.

For example, the power consumption of the resistor R110 reaches 2.7 W at on time (300 mA). Moreover, the power consumption is high, so a resistor of large size must be used as the resistor R110. This leads to an increase in the size of the circuit. Furthermore, output voltage of the op-amp OP101 becomes higher, so it is difficult to use a high-speed op-amp the settling time of which is about 2 ns.

A laser drive circuit in which the rising of laser output is made sharp by passing an overshoot that otherwise flows to a laser diode through an LCR circuit is proposed (see, for example, Japanese Utility Model Laid-Open Publication No. Hei5-48369).

As stated above, if the resistor is connected to the output of the drive circuit to suppress the occurrence of ringing, power consumption increases and the size of the circuit increases. Furthermore, high-speed optical switching is inhibited.

SUMMARY OF THE INVENTION

The present invention was made under the background circumstances described above. An object of the present invention is to provide an SOA module, an optical matrix switching device, and a drive circuit which can suppress ringing without increasing power consumption or circuit size or inhibiting high-speed operation.

In order to achieve the above object, a semiconductor optical amplification module for controlling the passing through of an optical signal is provided. This semiconductor optical amplification module comprises a semiconductor optical amplifier for outputting the optical signal inputted according to driving current and a diode connected in parallel with the semiconductor optical amplifier.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
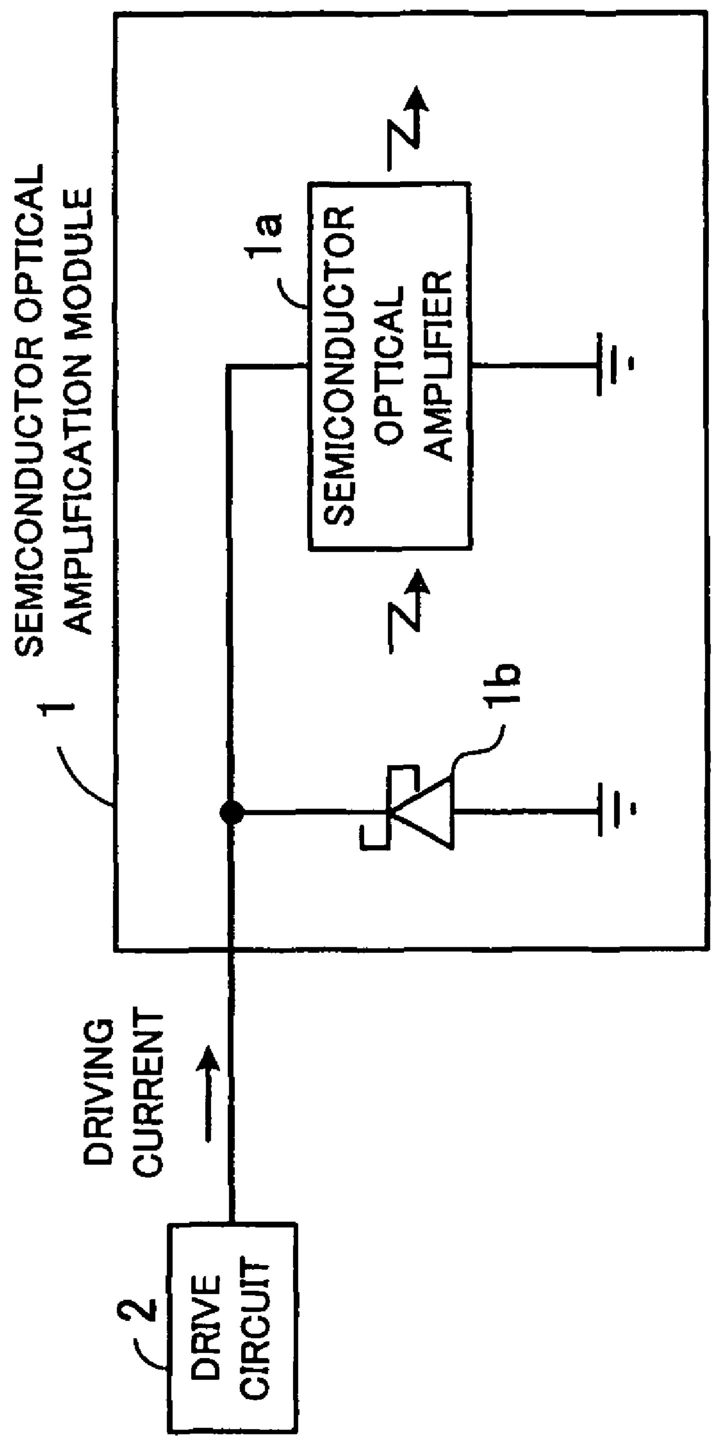
FIG. 1 is a view for giving an overview of a semiconductor optical amplification module.

The principles underlying the present invention will now be described in detail with reference to the drawing.

FIG. 1 is a view forgiving an overview of a semiconductor optical amplification module. As shown in FIG. 1, a semiconductor optical amplification module 1 includes a semiconductor optical amplifier 1*a* and a diode 1*b*.

The semiconductor optical amplifier 1*a* outputs an optical signal inputted according to driving current outputted from a drive circuit 2. The diode 1*b* is connected in parallel with the semiconductor optical amplifier 1*a*.

When the driving current outputted from the drive circuit 2 is switched from an on state to an off state, a negative undershoot appears. As a result, an electric current runs through the diode 1*b* and an increase in voltage caused by the undershoot is suppressed. Accordingly, the occurrence of ringing is suppressed.

As stated above, with the semiconductor optical amplification module 1 the diode 1*b* is connected in parallel with the semiconductor optical amplifier 1*a*. Accordingly, it is possible to suppress ringing which occurs at the time of turning on/off the driving current without increasing power consumption or circuit size or inhibiting high-speed operation.

A first embodiment of the present invention will now be described in detail with reference to the drawings.

Figure 2:
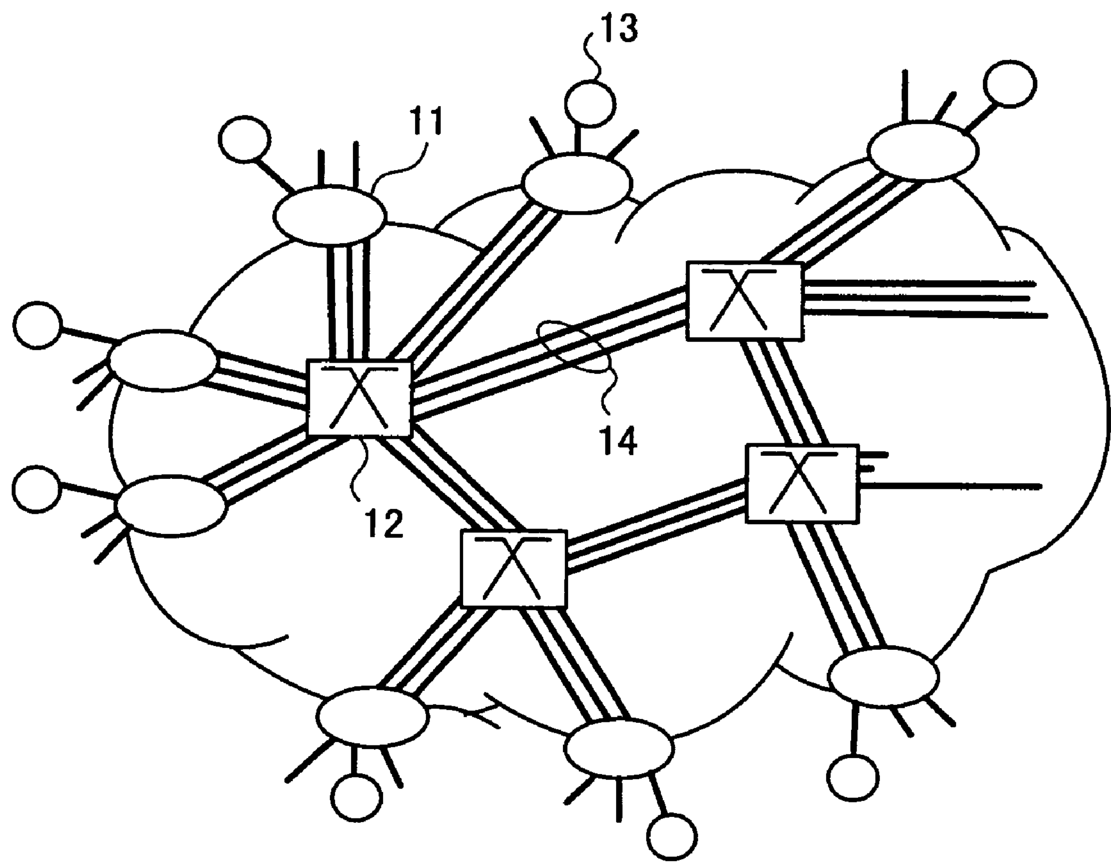
FIG. 2 is a view showing an example of the structure of an optical packet switching network to which an SOA module according to a first embodiment of the present invention is applied.

FIG. 2 is a view showing an example of the structure of an optical packet switching network to which an SOA module according to a first embodiment of the present invention is applied. As shown in FIG. 2, the optical packet switching network comprises edge nodes 11, core nodes 12, access nodes 13, and optical fibers 14.

The access node 13 such as a subscriber's terminal is connected to the edge node 11. The edge node 11 includes an optical packet assembly for converting signal data sent from the subscriber into an optical packet. In addition, the edge node 11 is connected to the core node 12.

The core node 12 switches the optical packet sent from the edge node 11 to another core node 12 or the edge node 11 under the control thereof.

Figure 3:
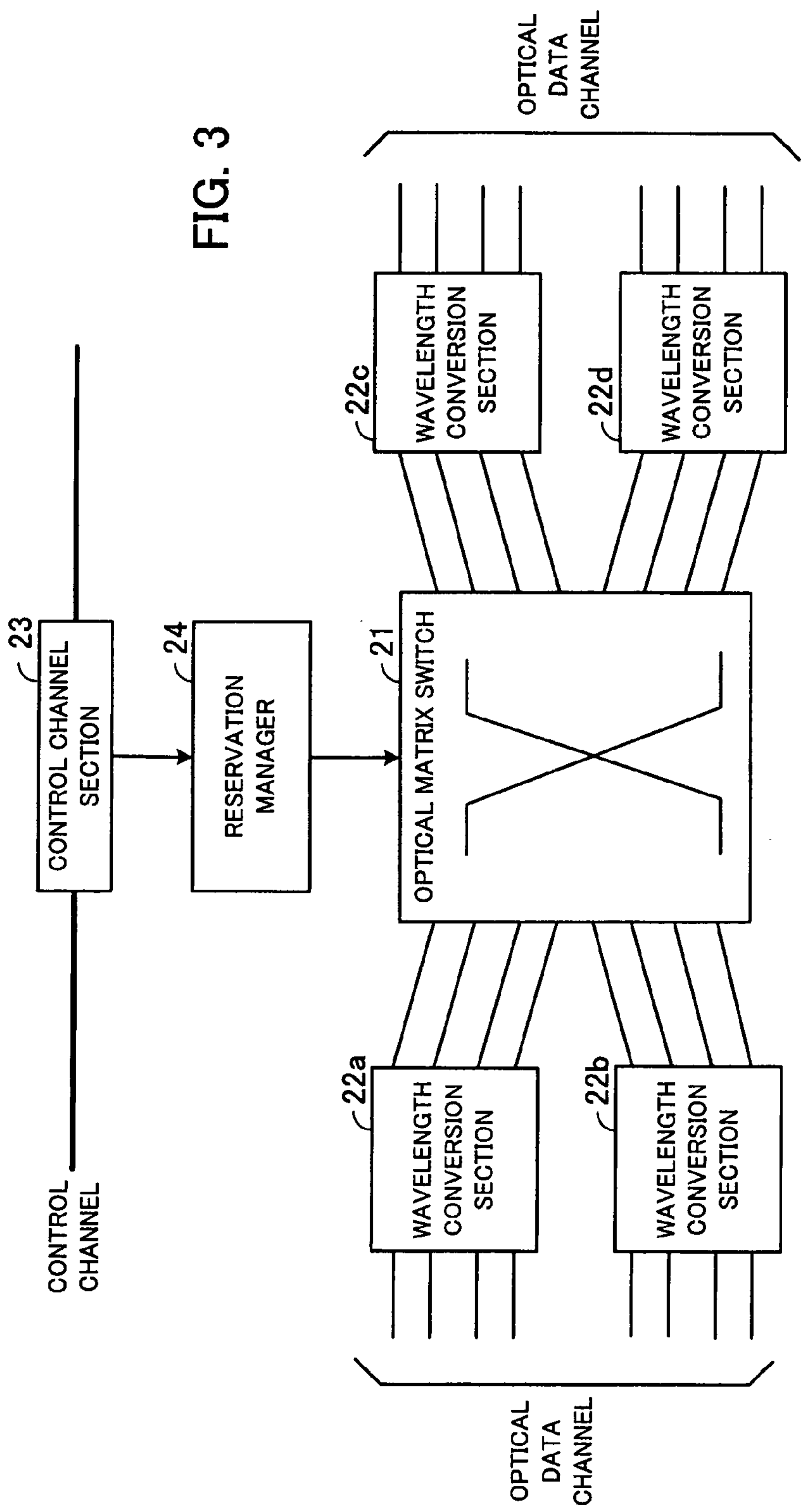
FIG. 3 is a view for describing the core node shown in FIG. 2.

FIG. 3 is a view for describing the core node shown in FIG. 2. The core node 12 includes an optical matrix switch 21 for switching the optical packet. The optical packet is sent by an optical data channel of the optical fiber 14. The optical data channel is made up of channels in the optical fiber 14 which physically connects the edge node 11 and the core node 12 or the core nodes 12. These channels differ in wavelength. Optical packets are wavelength-converted by wavelength conversion sections 22*a* through 22*d*. The wavelength-converted optical packets are inputted to the optical matrix switch 21 and path switching is performed.

Path switching is performed by the optical matrix switch 21 in accordance with instructions from a control channel section 23 and a reservation manager 24. Optical packet path information is included in a control channel and is inputted to the control channel section 23.

The control channel section 23 analyzes a label signal transmitted via the control channel. The control channel may be a channel which differs from the optical data channel in the optical fiber 14 that physically connects the core nodes 12 in wavelength, an optical fiber other than the optical fiber 14, or a coaxial line.

The reservation manager 24 analyzes the path information included in the label signal sent via the control channel and controls the optical matrix switch 21. The optical matrix switch 21 switches optical packet paths to output ports designated by the reservation manager 24.

Figure 4:
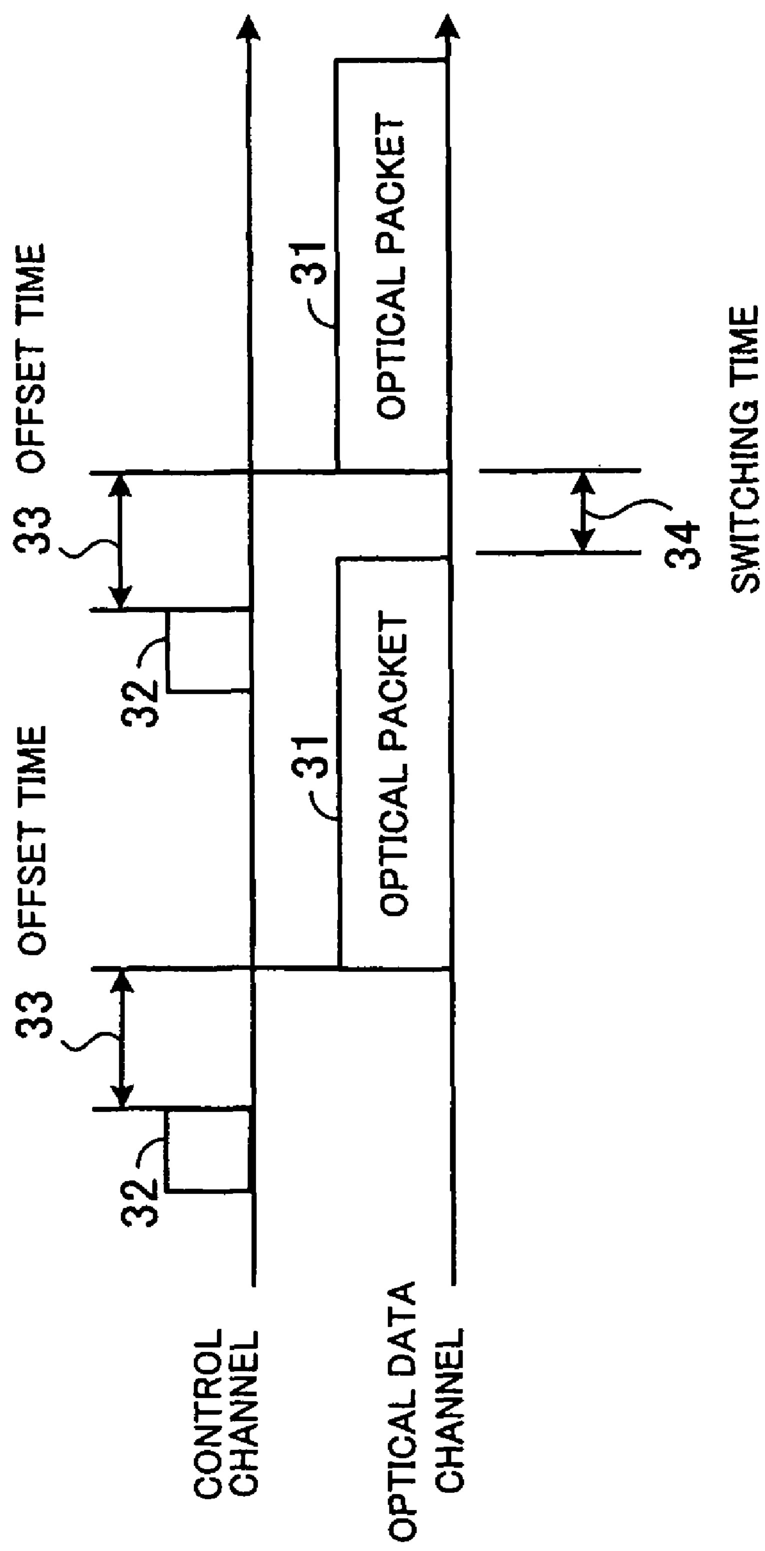
FIG. 4 is a view showing timing at which optical packet path switching is performed.

FIG. 4 is a view showing timing at which optical packet path switching is performed. As shown in FIG. 4, a path of an optical packet 31 is switched constant offset time 33 after a label signal 32 including path information inputted to the control channel section 23. It is necessary to make switching time 34 of the optical matrix switch 21 shorter than or equal to, for example, about 45 ns. This is guard time by which each optical packet 31 is not influenced. That is to say, with an optical packet switching system optical port switching must be completed in the short guard time.

Figure 5:
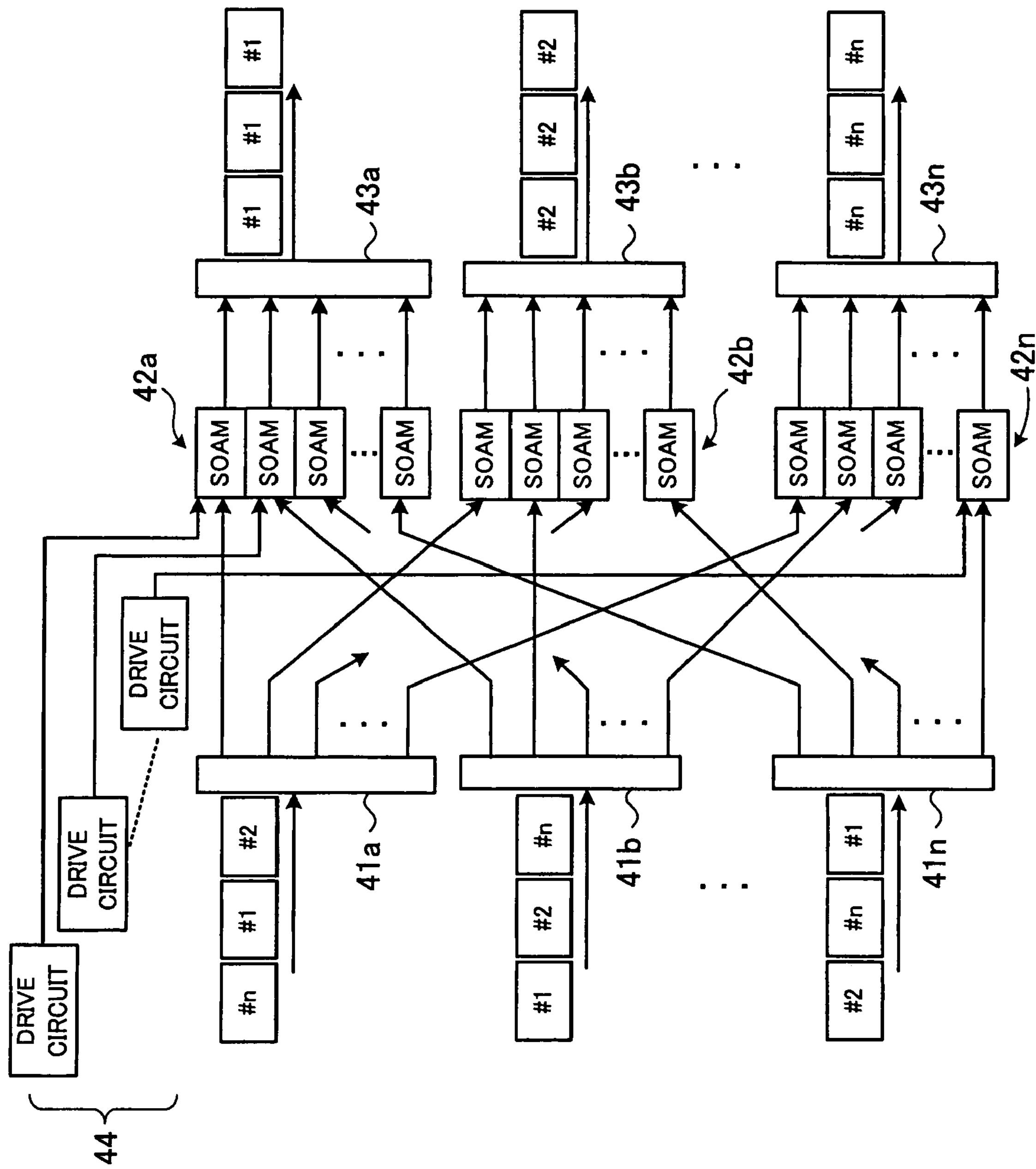
FIG. 5 is a view showing the details of the optical matrix switch shown in FIG. 3.

FIG. 5 is a view showing the details of the optical matrix switch shown in FIG. 3. As shown in FIG. 5, the optical matrix switch includes optical branching couplers 41*a* through 41*n*, SOA module groups 42*a* through 42*n*, and optical multiplexing couplers 43*a* through 43*n*.

Each of the optical branching couplers 41*a* through 41*n* has one input port and n output ports. The optical branching coupler 41*a* receives an optical packet sent via a first data channel. The optical branching coupler 41*b* receives an optical packet sent via a second data channel. Similarly, the optical branching coupler 41*n* receives an optical packet sent via an nth data channel.

In this example, the optical branching coupler 41*a* receives optical packets #2, #1, and #n from the first data channel in that order. The optical branching coupler 41*b* receives optical packets #n, #2, and #1 from the second data channel in that order. The optical branching coupler 41*n* receives optical packets #1, #n, and #2 from the nth data channel in that order.

Each of the optical packets #1 through #n is to be outputted from each of the optical multiplexing couplers 43*a* through 43*n* described later.

The optical branching couplers 41*a* through 41*n* are included in the optical matrix switch. Accordingly, each of the optical branching couplers 41*a* through 41*n* splits the input optical packets the number of which corresponds to that of the optical multiplexing couplers 43*a* through 43*n* described later, and outputs the split optical packets from output ports.

The SOA module group 42*a* includes SOA modules (SOAMs in FIG. 5) the number of which corresponds to that of the optical branching couplers 41*a* through 41*n*. Similarly, each of the SOA module groups 42*b* through 42*n* includes SOA modules the number of which corresponds to that of the optical branching couplers 41*a* through 41*n*. Each SOA module includes an SOA and a Schottky barrier diode connected in parallel with the SOA.

Each SOA module included in the SOA module group 42*a* is connected to one output port of one of the optical branching couplers 41*a* through 41*n*. Similarly, each SOA module included in the SOA module group 42*n* is connected to one output port of one of the optical branching couplers 41*a* through 41*n*.

Output of the SOA module group 42*a* is connected to the optical multiplexing coupler 43*a*. Similarly, output of the SOA module group 42*n* is connected to the optical multiplexing coupler 43*n*.

Each SOA module included in the SOA module groups 42*a* through 42*n* switches depending on the presence or absence of driving current which flows from a drive circuit group 44. That is to say, an optical packet inputted to each SOA module is outputted as an output optical packet or is intercepted, according to driving current which flows from the drive circuit group 44.

Each of the optical multiplexing couplers 43*a* through 43*n* has n input ports and one output port. The number of input ports each of the optical multiplexing couplers 43*a* through 43*n* has corresponds to that of the optical branching couplers 41*a* through 41*n*. Each of the optical multiplexing couplers 43*a* through 43*n* outputs optical packets inputted from input ports from one output port.

The drive circuit group 44 includes drive circuits the number of which corresponds to that of the SOA modules included in the SOA module groups 42*a* through 42*n*. Each drive circuit included in the drive circuit group 44 supplies driving current to an SOA module included in the SOA module groups 42*a* through 42*n* on the basis of a control signal sent from the reservation manager 24 shown in FIG. 3.

An overview of the operation of the optical matrix switch having the above structure will now be given.

At some point of time an optical packet #2 to be outputted from the optical multiplexing coupler 43*b* is inputted to the optical branching coupler 41*a*, an optical packet #n to be outputted from the optical multiplexing coupler 43*n* is inputted to the optical branching coupler 41*b*, and an optical packet #1 to be outputted from the optical multiplexing coupler 43*a* is inputted to the optical branching coupler 41*n*.

These optical packets are split and reach corresponding SOA modules included in the SOA module groups 42*a* through 42*n*.

At this time the drive circuit group 44 which drives the SOA module group 42*a* exercises control by instructions from the reservation manager 24 shown in FIG. 3 to turn on an SOA module connected to the optical branching coupler 41*n* to which the optical packet #1 to be outputted from the optical multiplexing coupler 43*a* is inputted and to turn off the other SOA modules.

Similarly, the drive circuit group 44 which drives the SOA module group 42*b* exercises control by instructions from the reservation manager 24 shown in FIG. 3 to turn on an SOA module connected to the optical branching coupler 41*a* to which the optical packet #2 to be outputted from the optical multiplexing coupler 43*b* is inputted and to turn off the other SOA modules.

The drive circuit group 44 which drives the SOA module group 42*n* exercises control by instructions from the reservation manager 24 shown in FIG. 3 to turn on an SOA module connected to the optical branching coupler 41*b* to which the optical packet #n to be outputted from the optical multiplexing coupler 43*n* is inputted and to turn off the other SOA modules.

As stated above, the optical packet #2 inputted to the optical branching coupler 41*a* is split. After that, control is exercised to turn on the SOA module of the SOA module group 42*a* corresponding to the optical multiplexing coupler 43*b* from which the optical packet #2 is to be outputted. As a result, the optical packet #2 is outputted from the optical multiplexing coupler 43*b*. In addition, control is exercised to turn off the other SOA modules of the SOA module group 42*a*. As a result, the optical packet #2 is not outputted from an optical multiplexing coupler other than the optical multiplexing coupler 43*b*.

Similarly, the optical packet #n inputted to the optical branching coupler 41*b* is outputted from the optical multiplexing coupler 43*n* and the optical packet #1 inputted to the optical branching coupler 41*n* is outputted from the optical multiplexing coupler 43*a*.

Figure 6B:
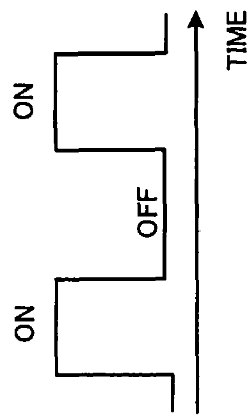
FIGS. 6A, 6B, and 6C are views for describing each drive circuit shown in FIG. 5 and an SOA included in each SOA module shown in FIG. 5.
Figure 6C:
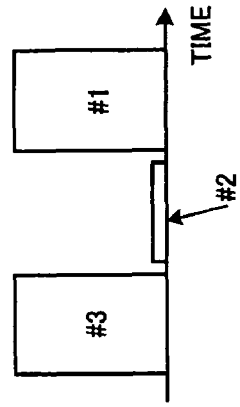
Figure 6A:
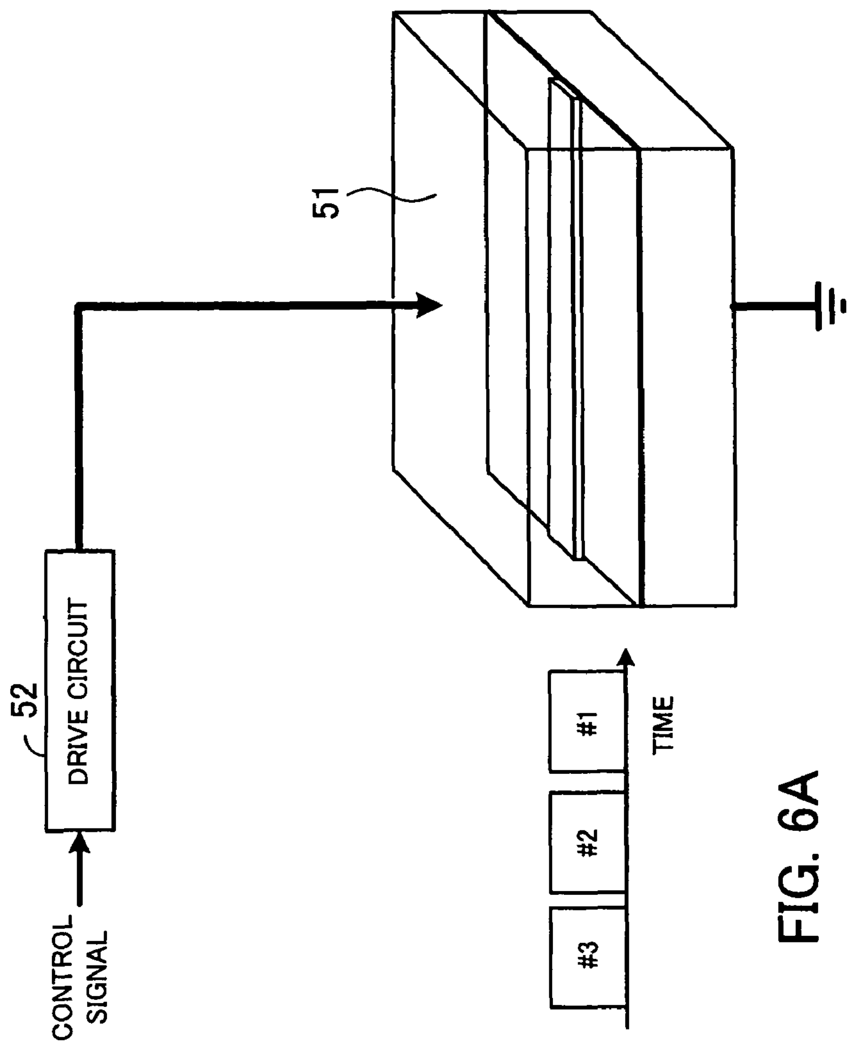

FIGS. 6A, 6B, and 6C are views for describing each drive circuit shown in FIG. 5 and an SOA included in each SOA module shown in FIG. 5. An SOA 51 shown in FIG. 6A corresponds to an SOA included in one SOAM of, for example, the SOA module group 42*a*. A drive circuit 52 corresponds to one drive circuit of, for example, the drive circuit group 44.

In FIG. 6A, optical signals inputted to the SOA 51 are shown. In FIG. 6B, driving current supplied from the drive circuit 52 to the SOA 51 is shown. In FIG. 6C, optical signals outputted from the SOA 51 are shown.

Figure 16B:
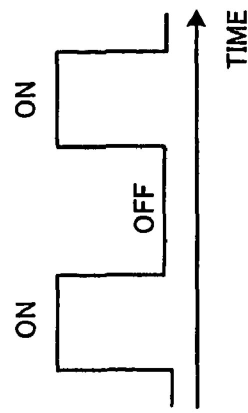
FIGS. 16A, 16B, and 16C are views for describing the operation of an SOA.
Figure 16C:
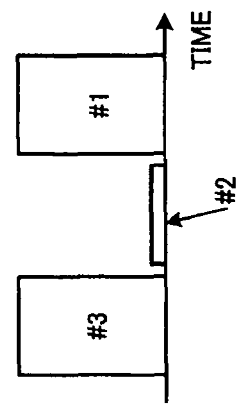
Figure 16A:
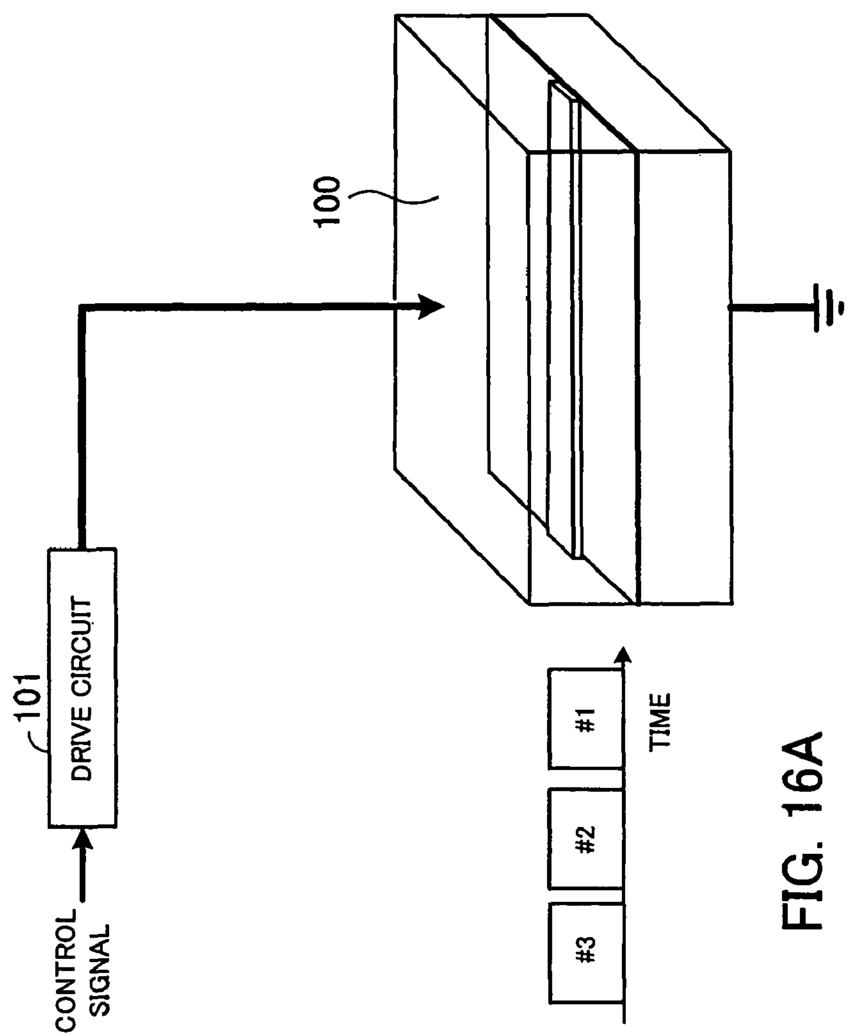
Figure 17:
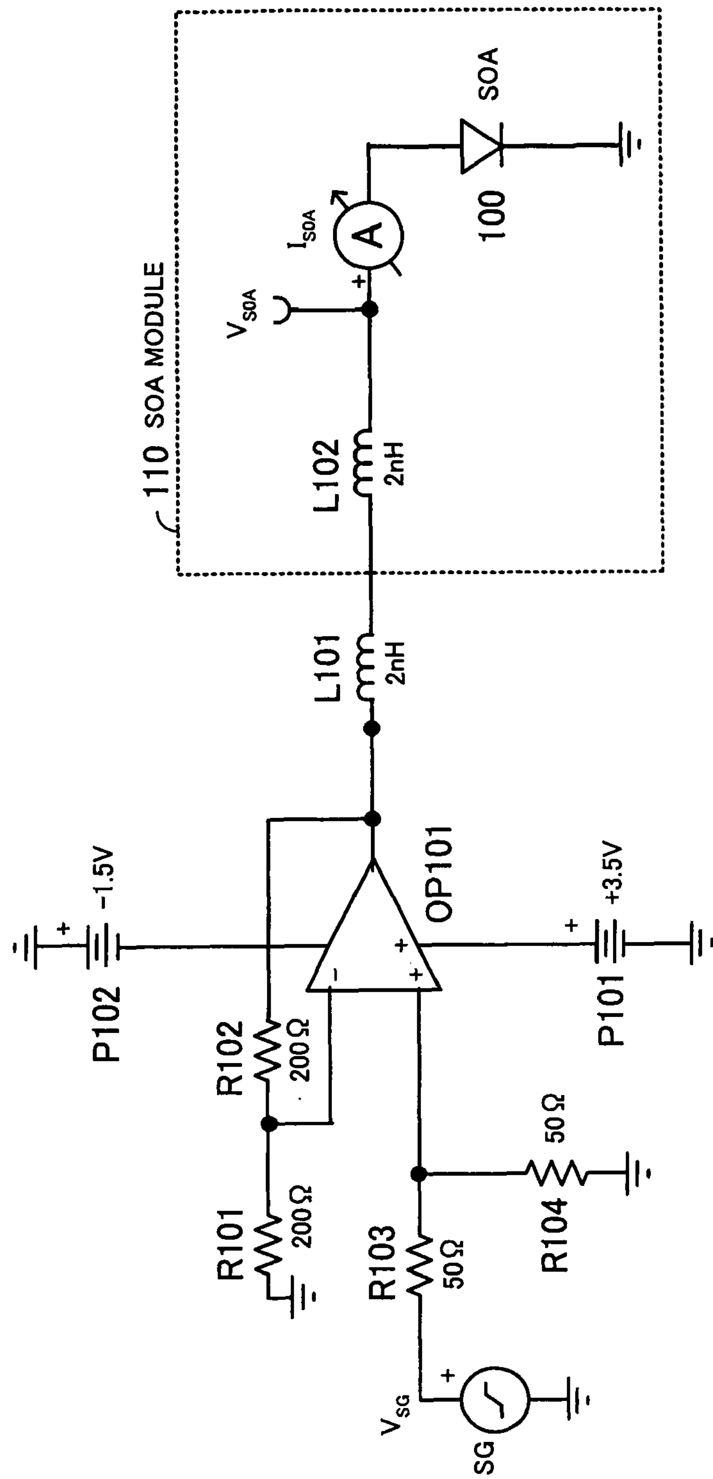
FIG. 17 is a view showing an example of the structure of the drive circuit shown in FIG. 16A.
Figure 18:
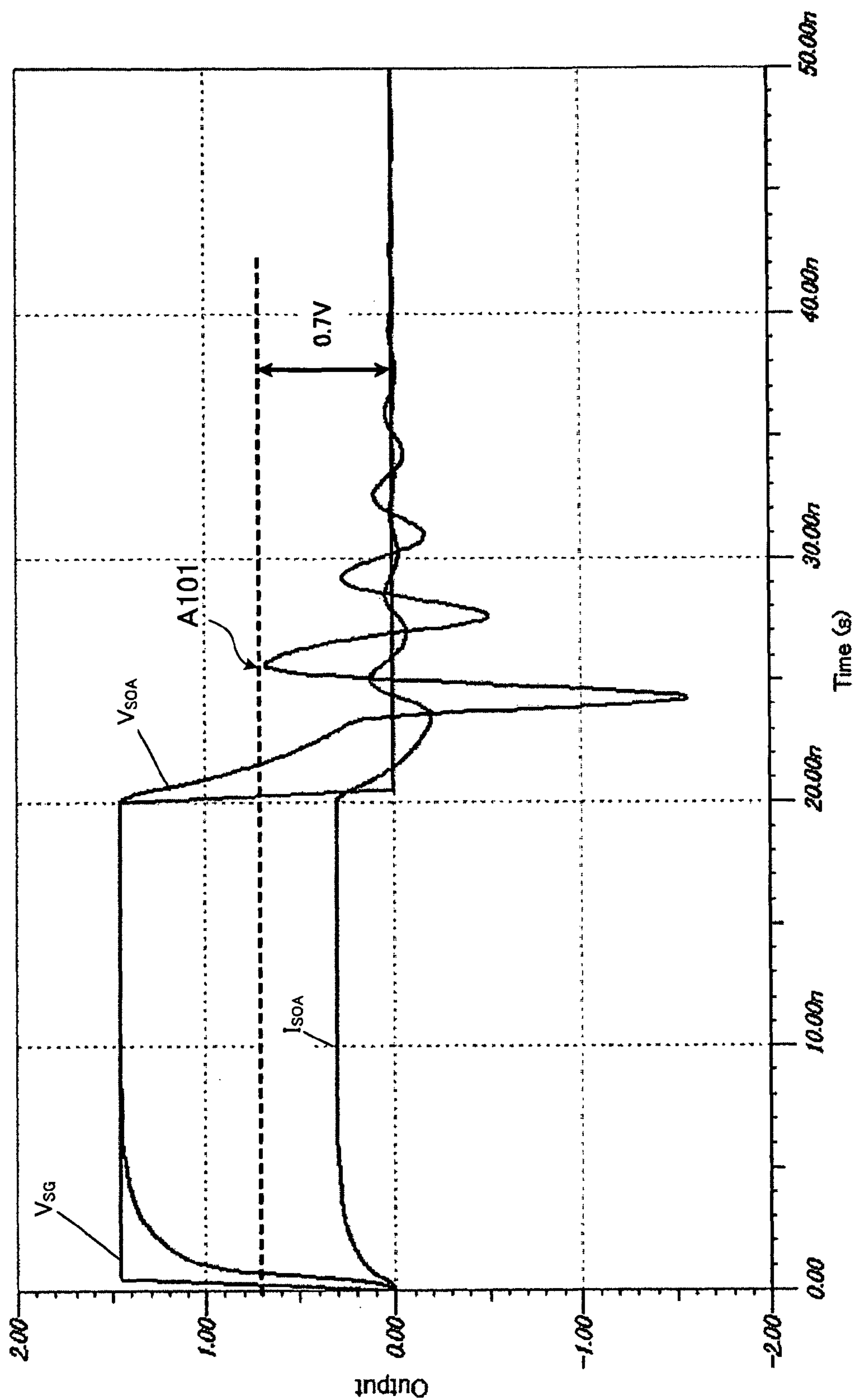
FIG. 18 is a view for describing ringing of the drive circuit shown in FIG. 17.

The SOA 51 shown in FIG. 6A is the same as that described in FIG. 16A. The drive circuit 52 shown in FIG. 6A is the same as that described in FIG. 16A. FIGS. 6A, 6B, and 6C are the same as FIGS. 16A, 16B, and 16C respectively.

Figure 7:
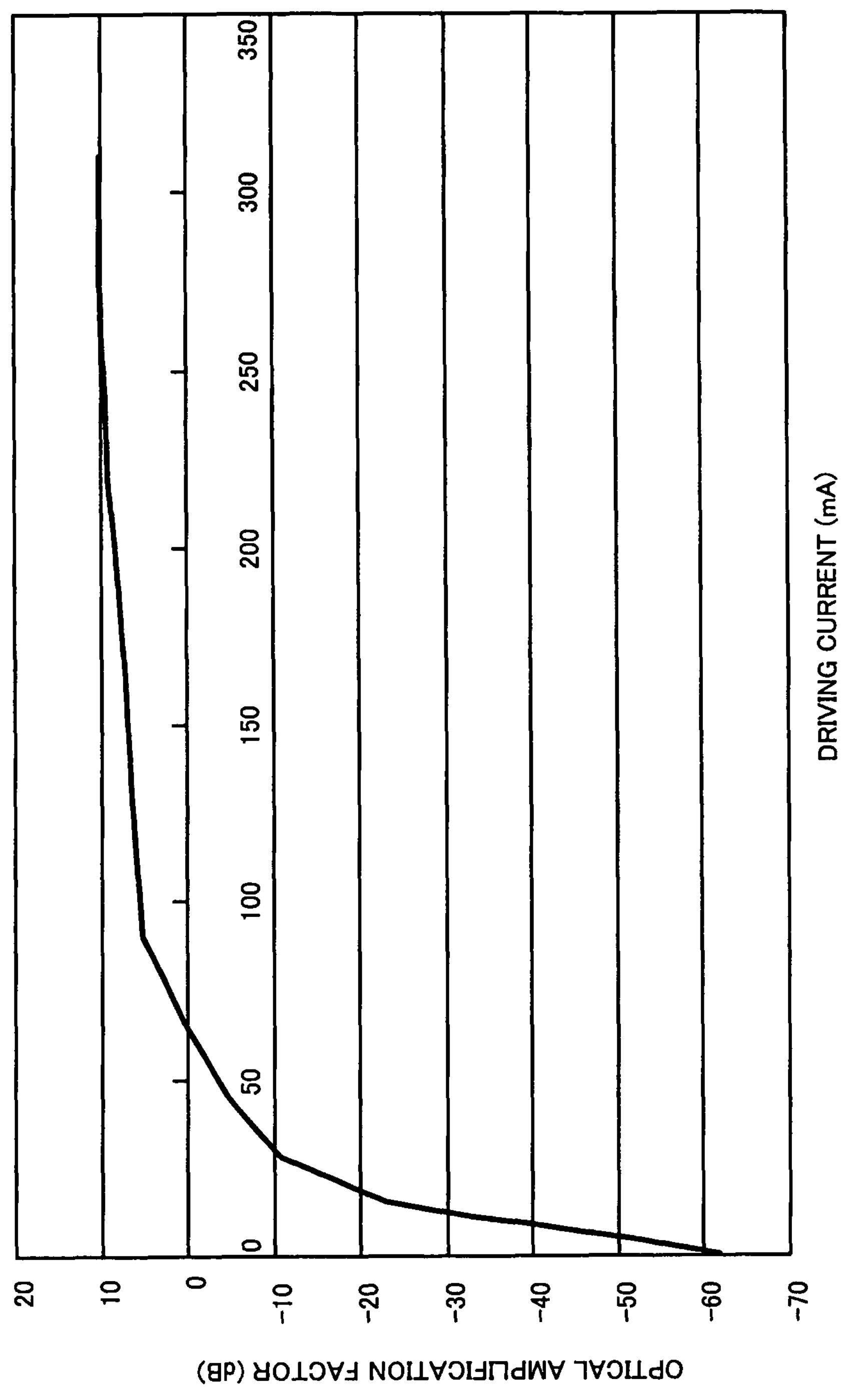
FIG. 7 is a view showing the relationship between driving current and an optical amplification factor of the SOA.

FIG. 7 is a view showing the relationship between driving current and an optical amplification factor of the SOA. The optical amplification factor of the SOA 51 changes according to driving current. In this example, an optical amplification factor of about 10 dB is obtained by passing a driving current of about 300 mA through the SOA 51. In this case, the SOA 51 is approximately saturated. When driving current decreases below 65 mA, the SOA 51 attenuates an optical signal inputted and functions as an optical attenuator.

Figure 8:
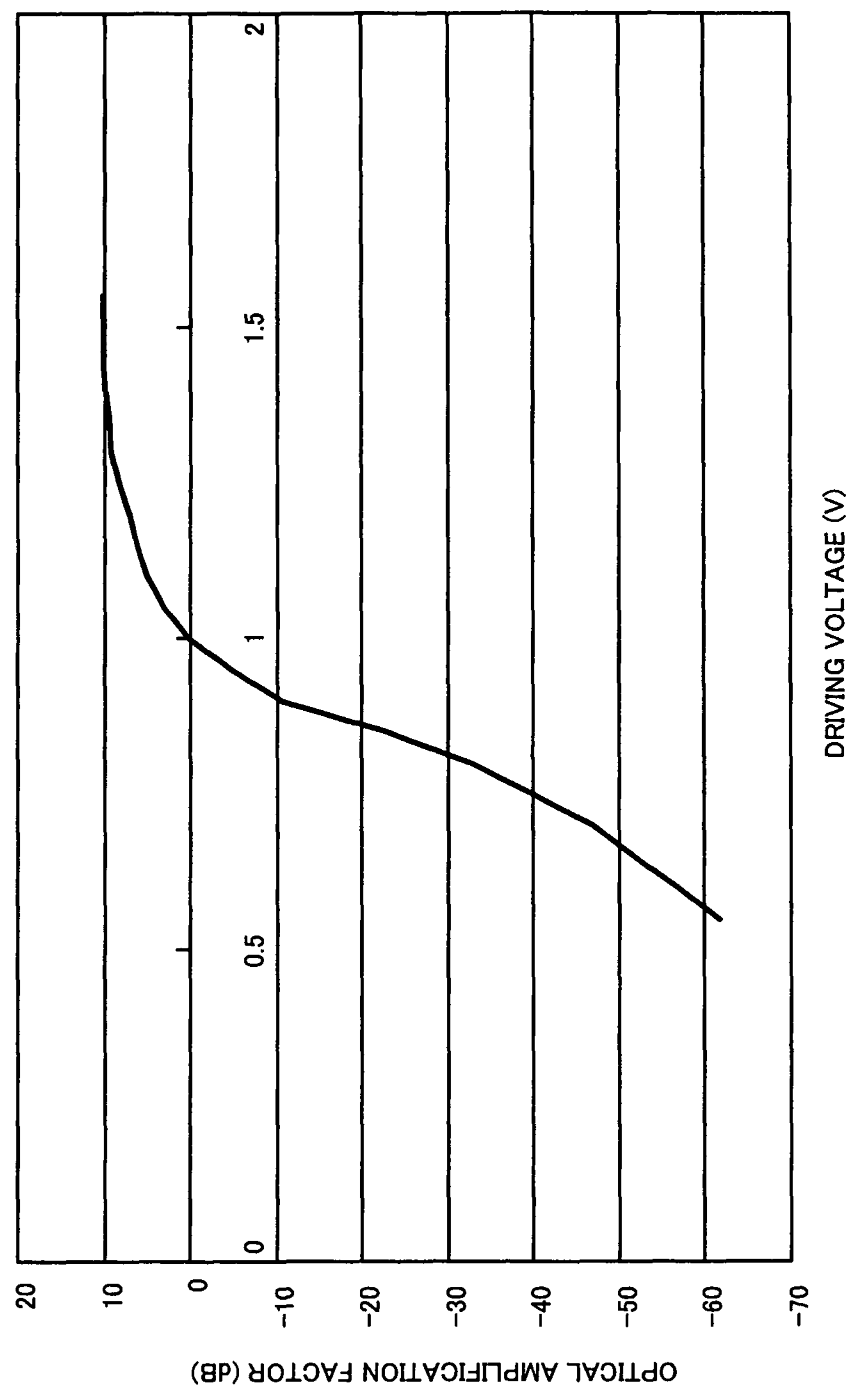
FIG. 8 is a view showing the relationship between driving voltage and an optical amplification factor of the SOA.

FIG. 8 is a view showing the relationship between driving voltage and an optical amplification factor of the SOA. The SOA 51 is driven by an electric current. However, the SOA 51 can be driven by voltage. In this case, voltage is applied to the SOA 51 by the use of a voltage source by which a current of 300 mA or more can be passed. As can be seen from FIG. 8, an optical amplification factor of about 10 dB is obtained by applying a voltage of about 1.5 V.

Compared with the graph in FIG. 7, a point on the graph in FIG. 8 where an optical amplification factor of about 10 dB is obtained corresponds to a current of about 300 mA. When driving voltage is decreased, the SOA 51 exhibits an optical attenuation characteristic. This is the same with the graph in FIG. 7. In the case of FIG. 8, the SOA 51 functions as an optical attenuator when driving voltage decreases below 1 V.

Figure 9:
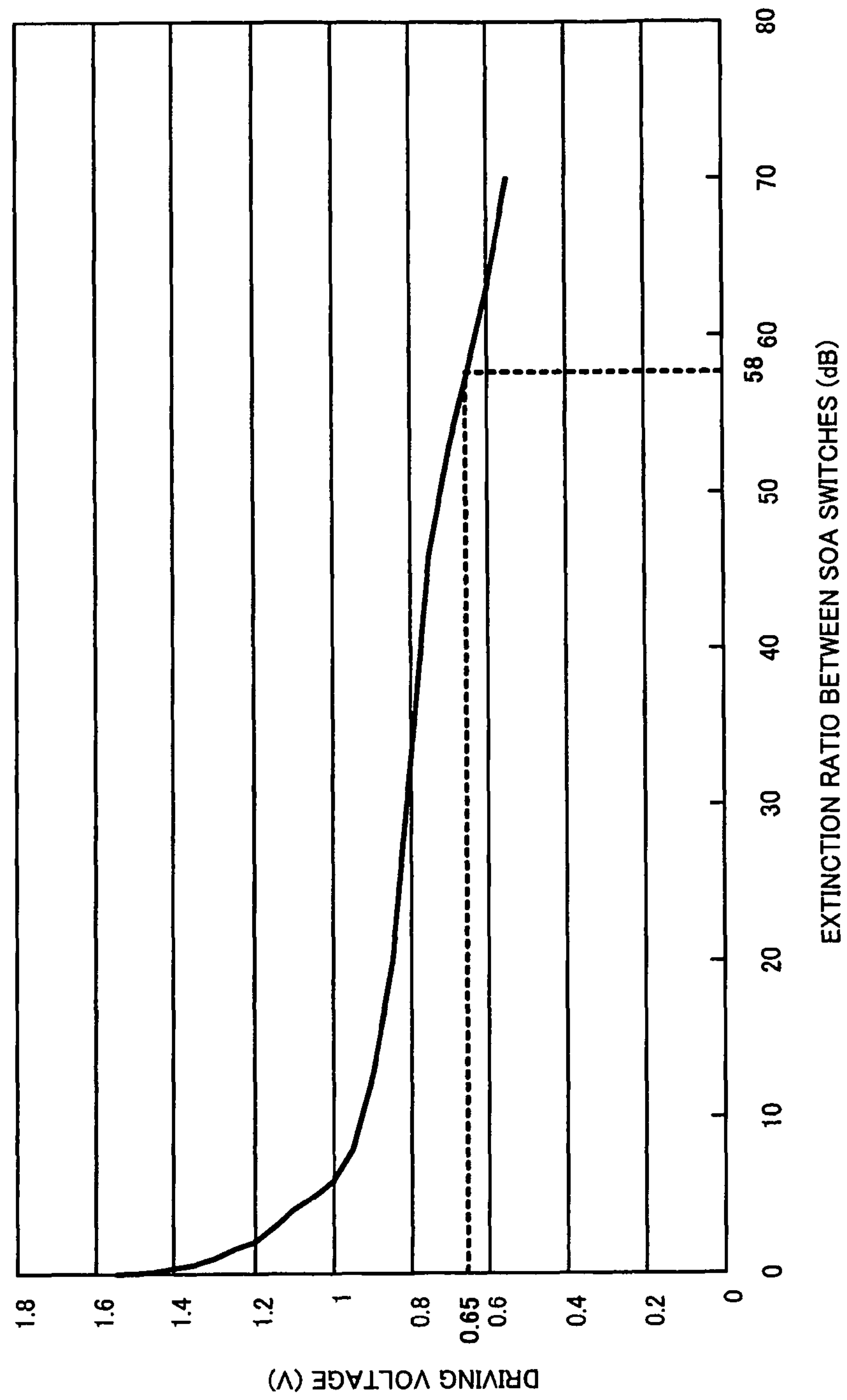
FIG. 9 is a view showing an extinction ratio between SOAs.

FIG. 9 is a view showing an extinction ratio between SOAs. With the optical matrix switch, as described in FIG. 5, the SOA module groups 42*a* through 42*n* are connected to the optical multiplexing couplers 43*a* through 43*n* respectively. The number of the SOA modules included in the SOA module groups 42*a* through 42*n* corresponds to that of the output ports of the optical branching couplers 41*a* through 41*n*.

As stated above, in the SOA module group 42*a*, for example, control must be exercised at the time of some SOA turning on so as to put the other SOAs in the off state. However, even if drive circuits output off-state driving current, optical leakage may occur in SOAs. Such optical leakage results in optical crosstalk in the optical multiplexing couplers 43*a* through 43*n*. With an 8×8 optical matrix switch, for example, an extinction ratio of about 58 dB is necessary between the on and off states. To obtain this extinction ratio, driving voltage must be set to 0.65 V or less.

Figure 10:
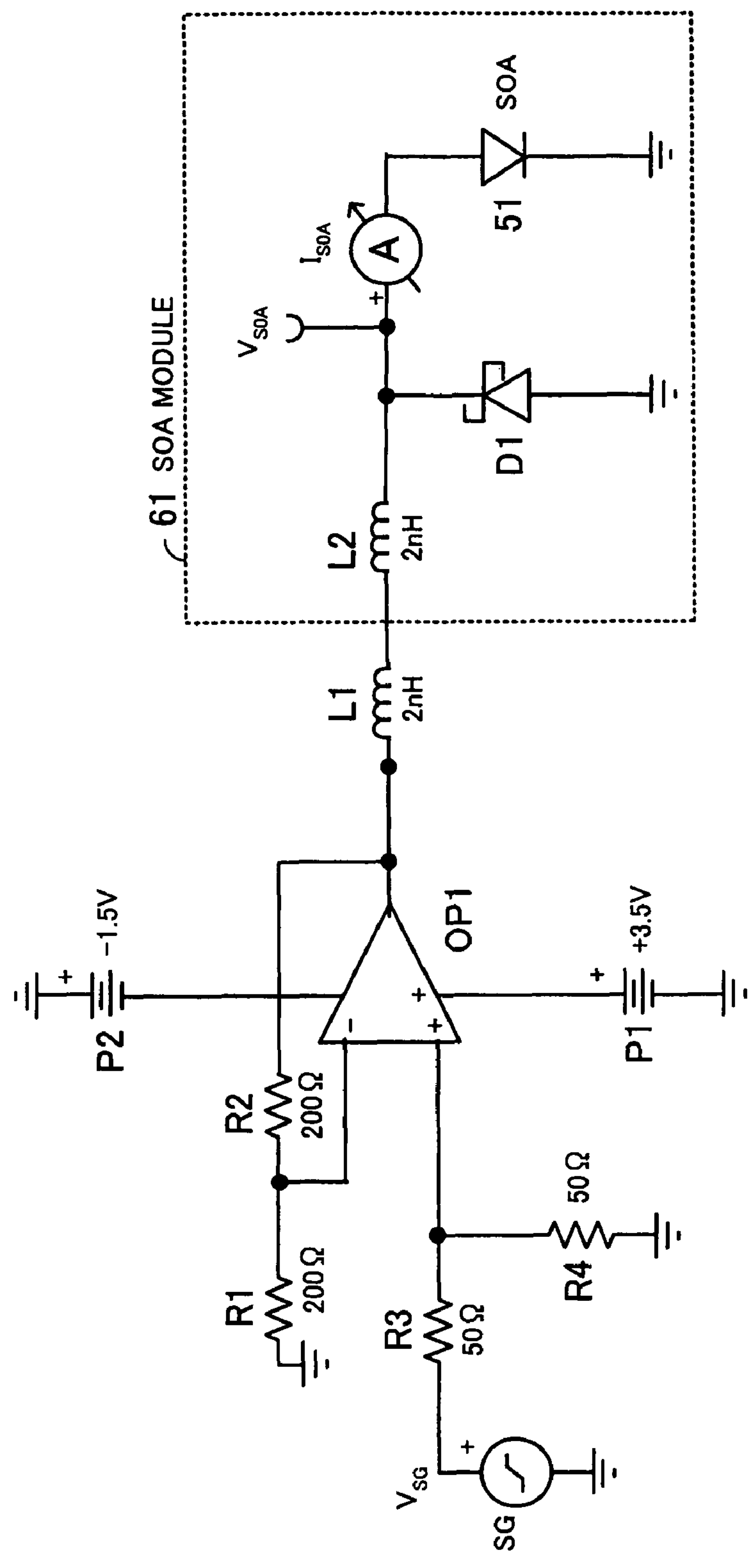
FIG. 10 is a circuit diagram showing a drive circuit and an SOA module shown in FIG. 5.

FIG. 10 is a circuit diagram showing a drive circuit and an SOA module shown in FIG. 5. A drive circuit includes resistors R1 through R4, an op-amp OP1, and power sources P1 and P2. The drive circuit corresponds to one drive circuit included in, for example, the drive circuit group 44 shown in FIG. 5. An SOA module 61 includes a Schottky barrier diode D1 and an SOA 51. The SOA module 61 corresponds to one SOA module included in the SOA module groups 42*a* through 42*n* shown in FIG. 5. In FIG. 10, an inductor L1 indicates a parasitic inductance component produced by a substrate pattern of the drive circuit and an inductor L2 indicates a parasitic inductance component produced by wirings in the SOA module 61.

The op-amp OP1 shown in FIG. 10 is included in a non-inverting amplifier. The output current capacity of the op-amp OP1 is 300 mA or more. The settling time of the op-amp OP1 is about 2 ns. That is to say, the op-amp OP1 is a high-speed op-amp. A square-wave signal for turning on/off the SOA 51 is inputted to a non-inverting input terminal of the op-amp OP1. In FIG. 10, a square-wave signal is generated by a signal generator SG and is inputted. Actually, however, a control signal is inputted from the reservation manager 24 shown in FIG. 3.

The Schottky barrier diode D1 and the SOA 51 are connected in parallel. The Schottky barrier diode D1 is a silicon Schottky barrier diode. A cathode of the Schottky barrier diode D1 is connected to an anode of the SOA 51. An anode of the Schottky barrier diode D1 is connected to a cathode of the SOA 51. That is to say, the Schottky barrier diode D1 and the SOA 51 are connected in parallel.

The SOA 51 has a junction capacitance of 40 to 70 pF. Therefore, when the SOA 51 is switched from the on state to the off state, electric charges charged at on time discharge and large ringing occurs because of back electromotive force generated by the inductors L1 and L2. However, an undershoot which appears on a negative side is suppressed by the Schottky barrier diode D1. That is to say, when the undershoot appears on the negative side, an electric current is passed by the Schottky barrier diode D1 to suppress the voltage of the undershoot. When driving voltage is positive, the impedance of the Schottky barrier diode D1 is high and the Schottky barrier diode D1 can be considered to be open. Accordingly, all of driving current flows to the SOA 51.

To suppress a decrease in operation speed caused by an increase in capacitive load, it is desirable that the Schottky barrier diode D1 should have a low junction capacitance of 2 to 3 pF or less. The forward voltage of a silicon Schottky barrier diode is lower than that of an ordinary diode, so a great ringing suppression effect is obtained.

Figure 11:
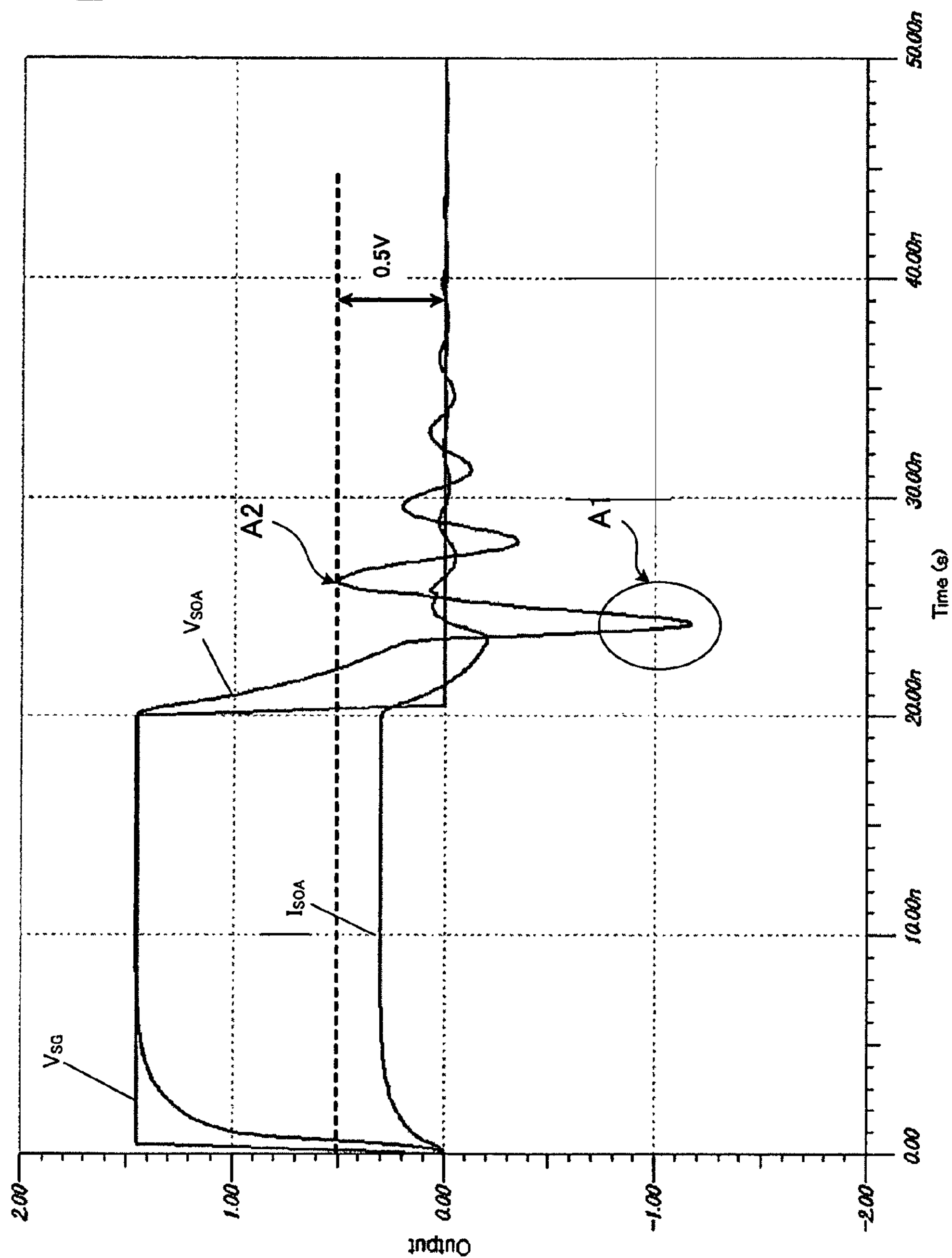
FIG. 11 is a view for describing ringing of the circuit shown in FIG. 10.

FIG. 11 is a view for describing ringing of the circuit shown in FIG. 10. $V_{SG}$ shown in FIG. 11 indicates voltage at a point $V_{SG}$ shown in FIG. 10. $V_{SOA}$ shown in FIG. 11 indicates voltage at a point $V_{SOA}$ shown in FIG. 10. $I_{SOA}$ shown in FIG. 11 indicates current at a point $I_{SOA}$ shown in FIG. 10. Each waveform shown in FIG. 11 indicates a result obtained by doing a simulation by the use of element values shown in FIG. 10.

Setting is performed so that the voltage at the point $V_{SG}$ shown in FIG. 10 will be 1.5 V at the time of the signal generator SG being in an on state and so that the voltage at the point $V_{SG}$ shown in FIG. 10 will be 0 V at the time of the signal generator SG being in an off state. The non-inverting amplifier is set so as to output voltage which is equal to input voltage.

As shown in FIG. 11, a voltage of 1.5 V is outputted from the non-inverting amplifier. At this time, as described in FIGS. 7 and 8, a driving current of about 300 mA runs through the SOA 51. As a result, the SOA 51 turns on. When a voltage of 0 V is outputted from the non-inverting amplifier, an electric current does not run through the SOA 51 and the SOA 51 turns off.

As stated above, ringing occurs at the time of output voltage of the op-amp OP1 falling (at the time of the SOA 51 turning off). As shown by an arrow A1, however, the voltage of a first undershoot which appears on the negative side is suppressed by the Schottky barrier diode D1. Accordingly, the voltage of an overshoot which next appears on a positive side is also suppressed as shown by an arrow A2.

As described in FIG. 9, with an 8×8 optical matrix switch an extinction ratio of about 58 dB is necessary to suppress optical crosstalk in the optical multiplexing couplers 43*a* through 43*n*. To obtain this extinction ratio, driving voltage must be set to 0.65 V or less at the time of the SOA 51 being in the off state. As shown by the arrow A1, the first undershoot which appears on the negative side is suppressed by the Schottky barrier diode D1. As a result, the voltage of the positive overshoot shown by the arrow A2 can be made 0.65 V or less. That is to say, an extinction ratio of about 58 dB can be obtained when the SOA 51 is in the off state.

Figure 19:
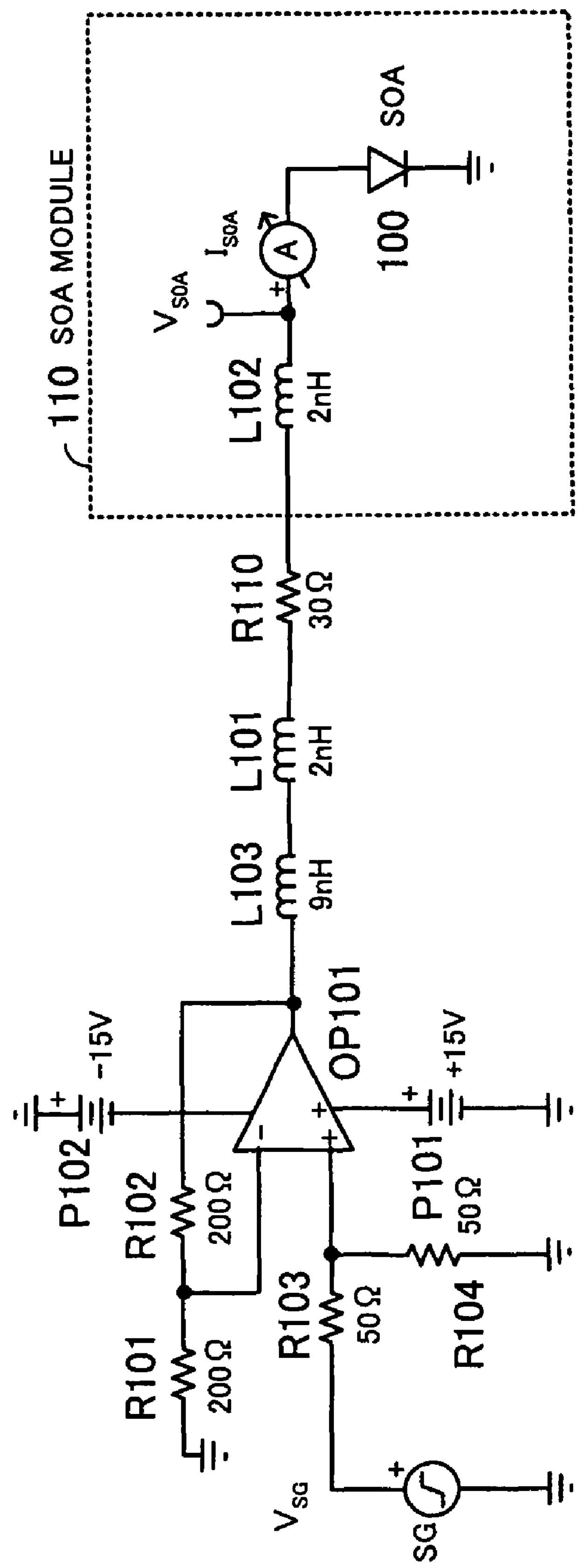
FIG. 19 is a view showing an example of the structure of a drive circuit which suppresses ringing.
Figure 20:
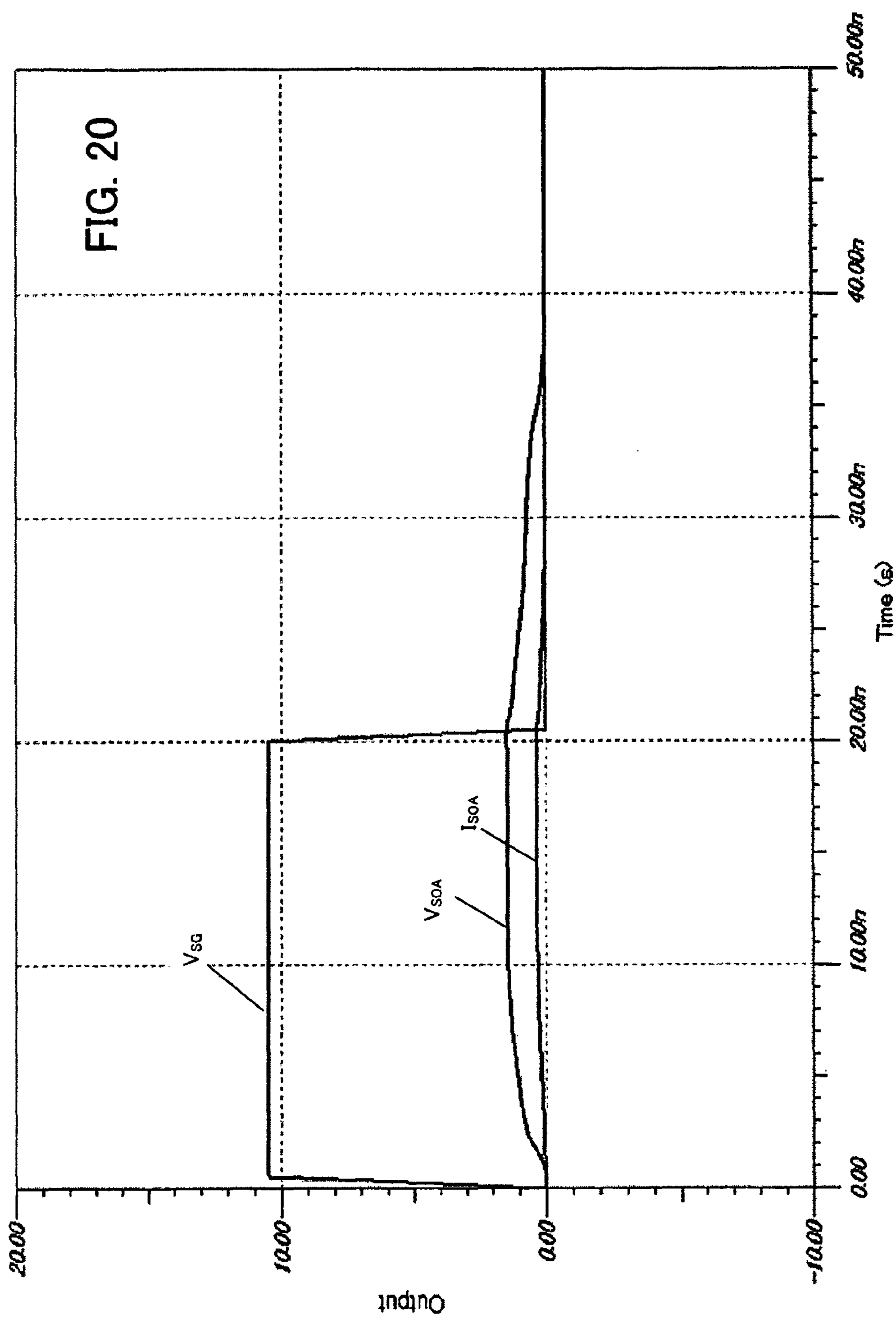
FIG. 20 is a view for describing ringing of the drive circuit shown in FIG. 19.

By connecting the Schottky barrier diode D1 and the SOA 51 in parallel in this way, it becomes possible to suppress ringing without increasing power consumption. With the circuit shown in FIG. 19, such an increase in power consumption takes place. In addition, there is no need to connect a large resistor for suppressing ringing. As a result, the size of a circuit can be reduced. Furthermore, compared with the circuit shown in FIG. 19, the output voltage of the op-amp OP1 is low. Therefore, the high-speed op-amp OP1 can be used and high-speed operation is not inhibited.

In the above example, the Schottky barrier diode D1 is included in the SOA module 61. However, the Schottky barrier diode D1 may be located outside the SOA module 61. For example, the Schottky barrier diode D1 may be connected to an output terminal of the op-amp OP1 of the drive circuit so that the Schottky barrier diode D1 will be parallel with the SOA 51.

A second embodiment of the present invention will now be described in detail with reference to the drawings. In the first embodiment of the present invention the silicon Schottky barrier diode D1 and the SOA 51 are connected in parallel. In the second embodiment of the present invention a gallium arsenide (GaAs) Schottky barrier diode and an SOA are connected in parallel.

Figure 12:
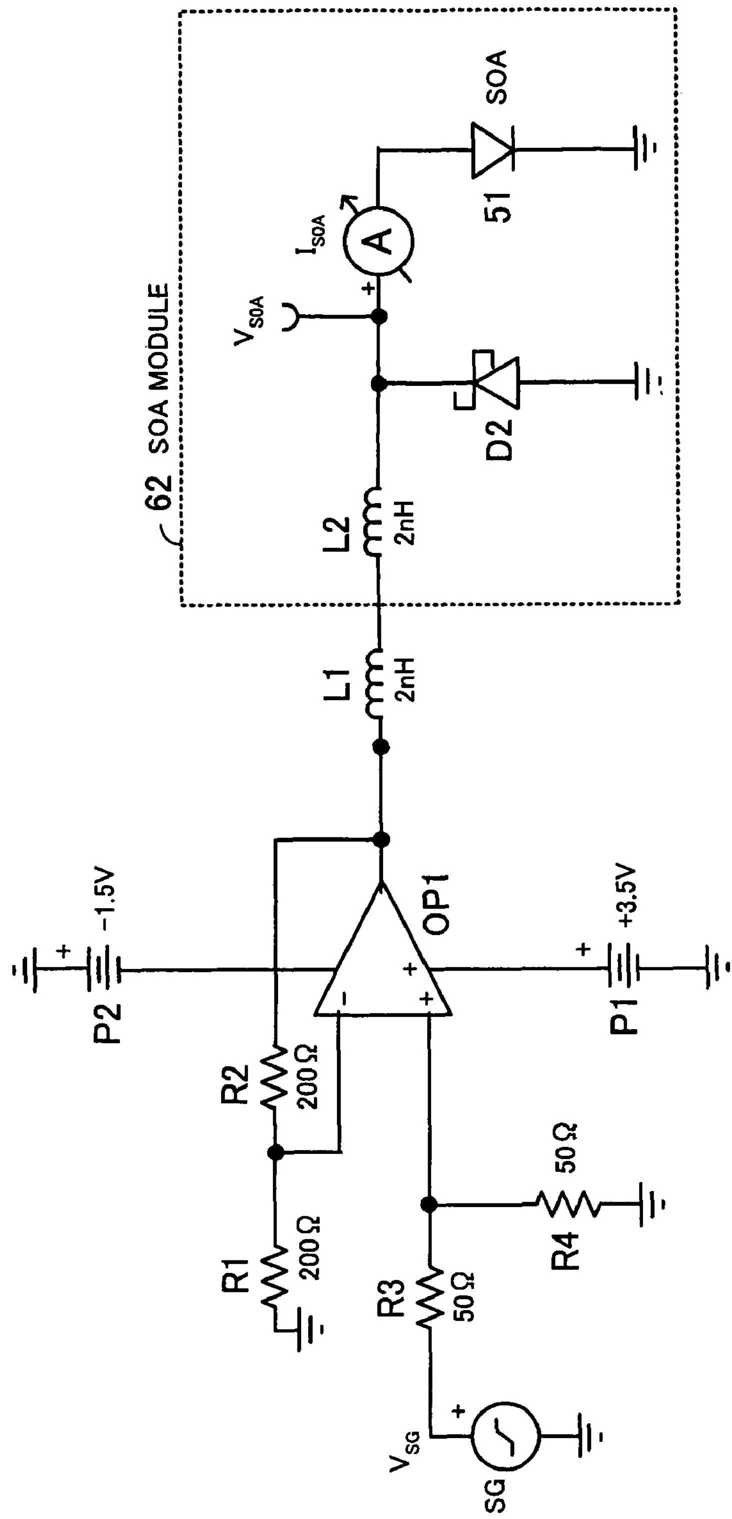
FIG. 12 is a view showing a drive circuit according to a second embodiment of the present invention.

FIG. 12 is a view showing a drive circuit according to a second embodiment of the present invention. Components in FIG. 12 that are the same as those shown in FIG. 10 are marked with the same symbols and descriptions of them will be omitted.

In FIG. 12, a Schottky barrier diode D2 included in an SOA module 62 is a GaAs Schottky barrier diode. An undershoot which appears on a negative side is suppressed by the GaAs Schottky barrier diode D2. This is the same with the silicon Schottky barrier diode D1 described in FIG. 10.

The junction capacitance of the GaAs Schottky barrier diode D2 is lower than that of a silicon Schottky barrier diode. Therefore, a response can be made at a higher speed and a great ringing suppression effect can be obtained.

Figure 13:
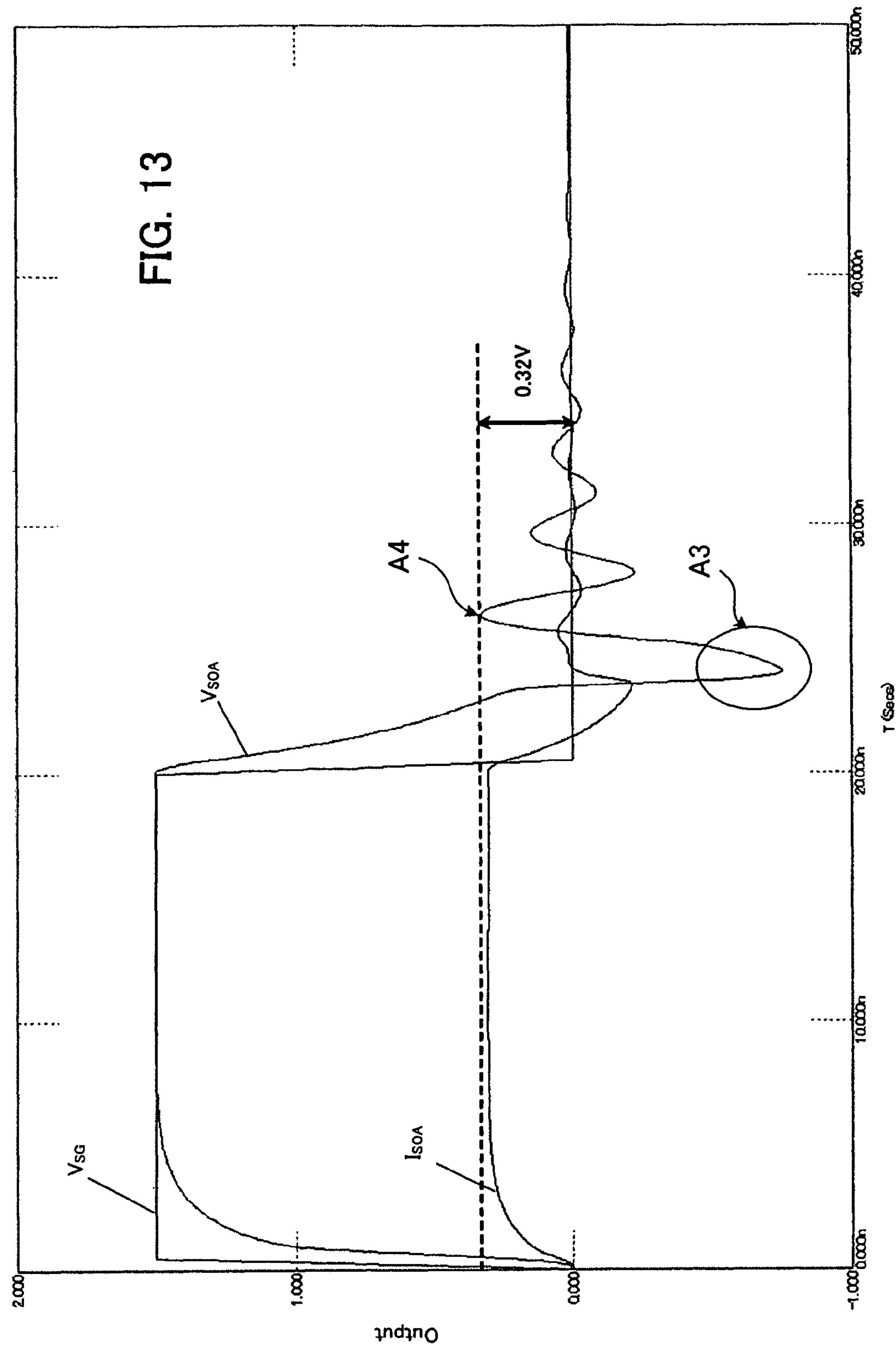
FIG. 13 is a view for describing ringing of the circuit shown in FIG. 12.

FIG. 13 is a view for describing ringing of the circuit shown in FIG. 12. $V_{SG}$ shown in FIG. 13 indicates voltage at a point $V_{SG}$ shown in FIG. 12. $V_{SOA}$ shown in FIG. 13 indicates voltage at a point $V_{SOA}$ shown in FIG. 12. $I_{SOA}$ shown in FIG. 13 indicates current at a point $I_{SOA}$ shown in FIG. 12. Each waveform shown in FIG. 13 indicates a result obtained by doing a simulation by the use of element values shown in FIG. 12.

Setting is performed so that the voltage at the point $V_{SG}$ shown in FIG. 12 will be 1.5 V at the time of the signal generator SG being in an on state and so that the voltage at the point $V_{SG}$ shown in FIG. 12 will be 0 V at the time of the signal generator SG being in an off state. A non-inverting amplifier is set so as to output voltage which is equal to input voltage.

As shown in FIG. 13, a voltage of 1.5 V is outputted from the non-inverting amplifier. At this time, as described in FIGS. 7 and 8, a driving current of about 300 mA runs through an SOA 51. As a result, the SOA 51 turns on. When a voltage of 0V is outputted from the non-inverting amplifier, an electric current does not run through the SOA 51 and the SOA 51 turns off.

Ringing occurs at the time of output voltage of an op-amp OP1 falling (at the time of the SOA 51 turning off). As shown by an arrow A3, however, the voltage of a first undershoot which appears on a negative side is suppressed by the Schottky barrier diode D2. Accordingly, the voltage of an overshoot which next appears on a positive side is also suppressed as shown by an arrow A4.

The voltage shown by the arrow A4 is 0.32 V. The voltage shown by the arrow A2 of FIG. 11 is 0.5 V. Therefore, the voltage shown by the arrow A4 is lower than the voltage shown by the arrow A2 of FIG. 11. That is to say, it turns out that compared with a silicon Schottky barrier diode, the Schottky barrier diode D2 has a great ringing suppression effect.

Connecting the GaAs Schottky barrier diode D2 and the SOA 51 in parallel in this way enables suppression of ringing without increasing power consumption. The circuit shown in FIG. 12 differs from the circuit shown in FIG. 19 in this respect. In addition, there is no need to connect a large resistor for suppressing ringing. As a result, the size of a circuit can be reduced. Furthermore, compared with the circuit shown in FIG. 19, the output voltage of the op-amp OP1 is low. Therefore, the high-speed op-amp OP1 can be used and high-speed operation is not inhibited. Moreover, compared with the case where a silicon Schottky barrier diode is used, a great ringing suppression effect is obtained.

A third embodiment of the present invention will now be described in detail with reference to the drawings. In a third embodiment of the present invention a Schottky barrier diode and an SOA are formed on one chip.

Figure 14:
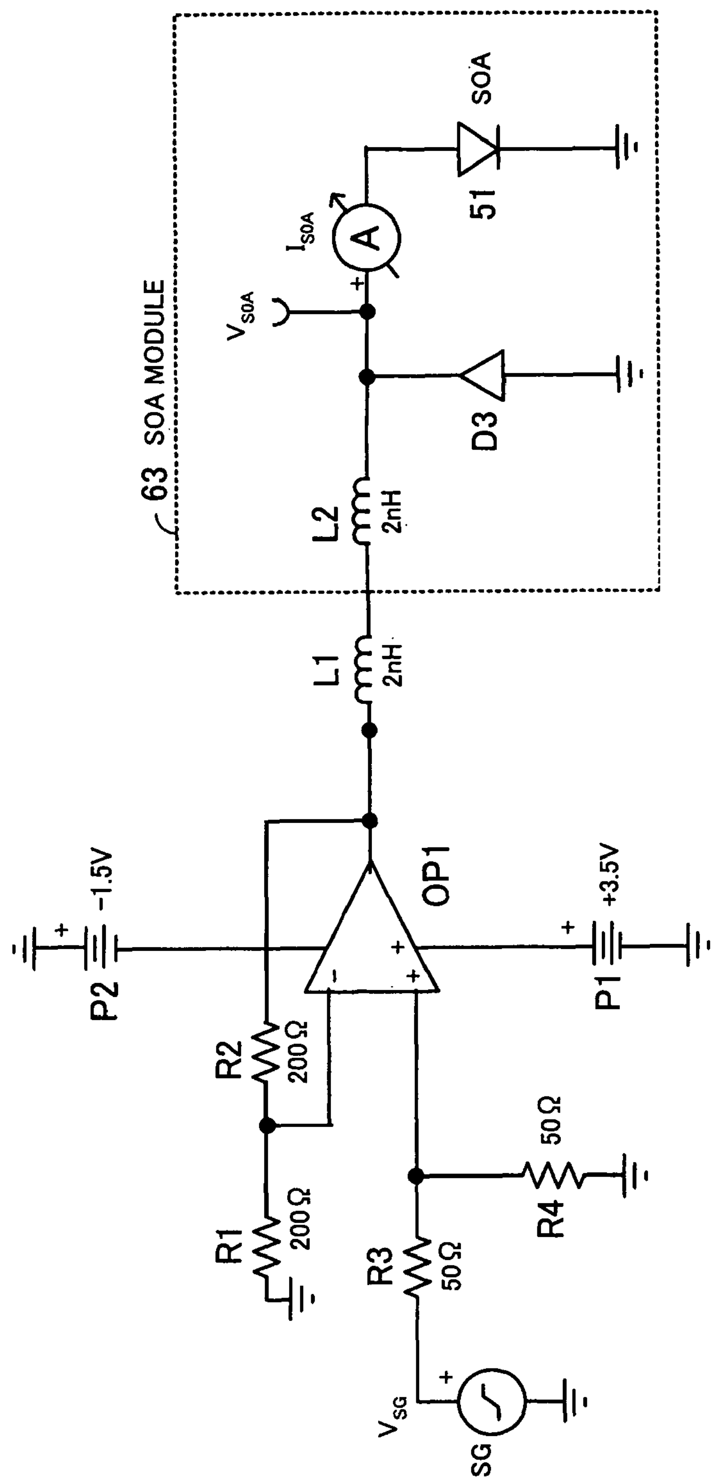
FIG. 14 is a view showing a drive circuit according to a third embodiment of the present invention.

FIG. 14 is a view showing a drive circuit according to a third embodiment of the present invention. Components in FIG. 14 that are the same as those shown in FIG. 10 are marked with the same symbols and descriptions of them will be omitted.

In FIG. 14, a Schottky barrier diode D3 and an SOA 51 are formed on one chip. That is to say, the Schottky barrier diode D3 and the SOA 51 are formed on the same wafer. The Schottky barrier diode D3 shown in FIG. 14 suppresses an undershoot which appears on a negative side. This is the same with the Schottky barrier diode D1 described in FIG. 10.

Figure 15:
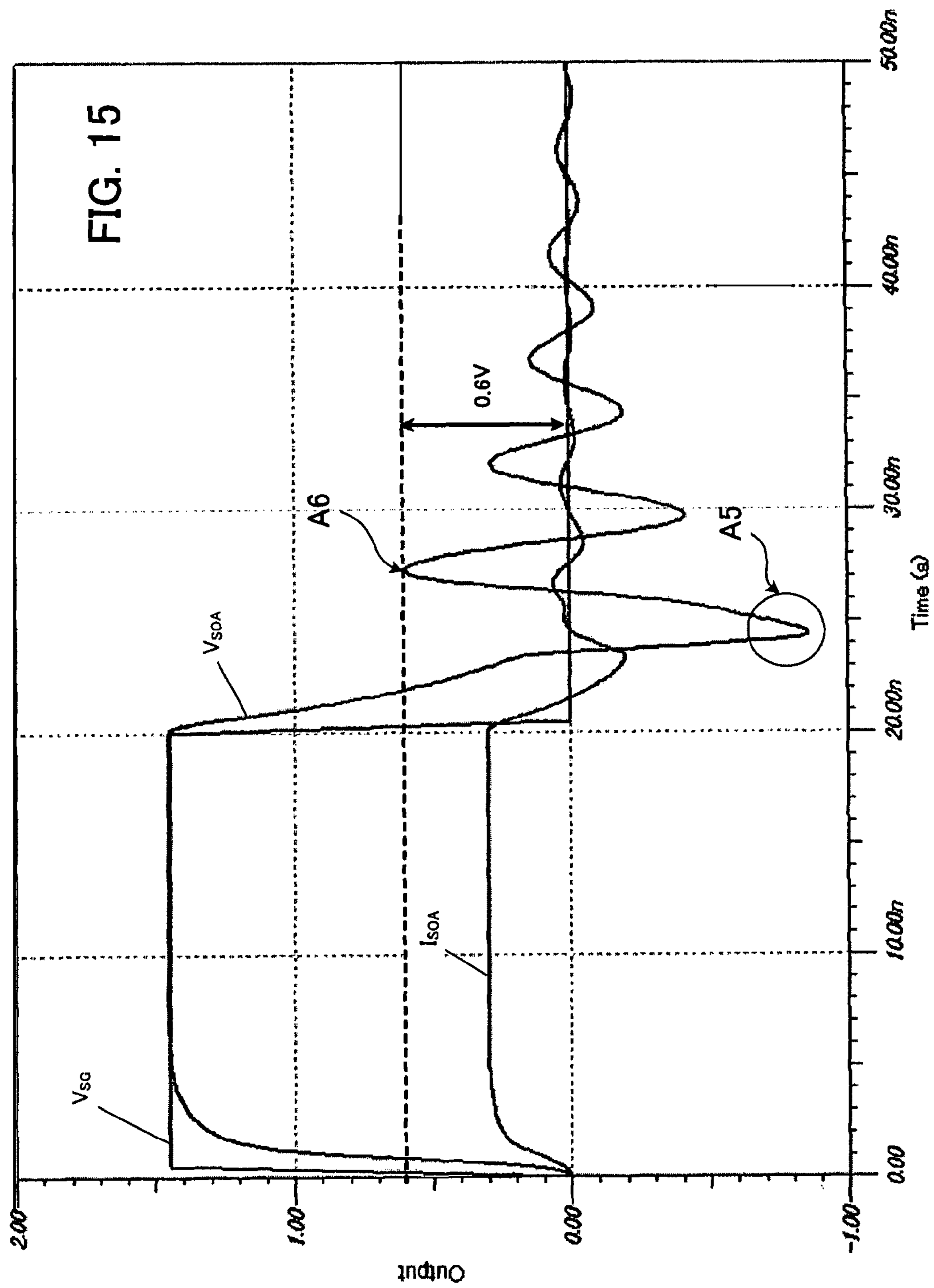
FIG. 15 is a view for describing ringing of the circuit shown in FIG. 14.

FIG. 15 is a view for describing ringing of the circuit shown in FIG. 14. $V_{SG}$ shown in FIG. 15 indicates voltage at a point $V_{SG}$ shown in FIG. 14. $V_{SOA}$ shown in FIG. 15 indicates voltage at a point $V_{SOA}$ shown in FIG. 14. $I_{SOA}$ shown in FIG. 15 indicates current at a point $I_{SOA}$ shown in FIG. 14. Each waveform shown in FIG. 15 indicates a result obtained by doing a simulation by the use of element values shown in FIG. 14.

Setting is performed so that the voltage at the point $V_{SG}$ shown in FIG. 14 will be 1.5 V at the time of a signal generator SG being in an on state and so that the voltage at the point $V_{SG}$ shown in FIG. 14 will be 0 V at the time of the signal generator SG being in an off state. A non-inverting amplifier is set so as to output voltage which is equal to input voltage.

As shown in FIG. 15, a voltage of 1.5 V is outputted from the non-inverting amplifier. At this time, as described in FIGS. 7 and 8, a driving current of about 300 mA runs through the SOA 51. As a result, the SOA 51 turns on. When a voltage of 0 V is outputted from the non-inverting amplifier, an electric current does not run through the SOA 51 and the SOA 51 turns off.

Ringing occurs at the time of output voltage of an op-amp OP1 falling (at the time of the SOA 51 turning off). As shown by an arrow A5, however, the voltage of a first undershoot which appears on a negative side is suppressed by the Schottky barrier diode D3. Accordingly, the voltage of an overshoot which next appears on a positive side is also suppressed as shown by an arrow A6.

By forming the Schottky barrier diode D3 and the SOA 51 on one chip in this way, a device can be miniaturized. In addition, if the Schottky barrier diode D3 and the SOA 51 are used as a module, an external terminal for connecting the Schottky barrier diode D3 must be located. In the third embodiment of the present invention, however, the Schottky barrier diode D3 and the SOA 51 are formed on one chip, so there is no need to locate such an external terminal.

With the semiconductor optical amplification module according to the present invention the semiconductor optical amplifier and the diode are connected in parallel. As a result, it becomes possible to suppress ringing which occurs at the time of turning on/off driving current without increasing power consumption or circuit size or inhibiting high-speed operation.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical matrix switching device for switching an optical output path, the device comprising:

- a plurality of drive circuits to receive a control signal and output driving current according to the control signal;
- a plurality of semiconductor optical amplification modules each including:
  - a semiconductor optical amplifier to output an optical signal inputted according to the driving current, and
  - a diode electrically coupled in parallel with the semiconductor optical amplifier so that an optical leakage of the semiconductor optical amplifier is suppressed;
- a plurality of optical branching couplers each having a plurality of output ports; and
- a plurality of optical multiplexing couplers each having a plurality of input ports,
- wherein a same number of the semiconductor optical amplification modules as the plurality of optical branching couplers is grouped so that the grouped semiconductor optical amplification modules correspond to the optical branching couplers,
- wherein each of the grouped semiconductor optical amplification modules that correspond to the optical branching couplers is connected to one of the plurality of output ports of each of the plurality of optical branching couplers, and
- wherein the grouped semiconductor optical amplification modules output the optical signal to the plurality of input ports of the plurality of optical multiplexing couplers.

* * * * *